(12) United States Patent
Leitner et al.

(10) Patent No.: US 6,805,392 B2
(45) Date of Patent: Oct. 19, 2004

(54) VEHICLE CARGO BED EXTENDER

(75) Inventors: Horst Leitner, Laguna Beach, CA (US); Jonathan Weisel, Norco, CA (US)

(73) Assignee: American Moto Products, Inc., Irvine, CA (US)

(*) Notice: Subject to any disclaimer, the term of this patent is extended or adjusted under 35 U.S.C. 154(b) by 0 days.

(21) Appl. No.: 10/171,456

(22) Filed: Jun. 11, 2002

(65) Prior Publication Data

US 2003/0146637 A1 Aug. 7, 2003

Related U.S. Application Data

(63) Continuation of application No. 09/524,332, filed on Mar. 13, 2000, now Pat. No. 6,402,215, which is a continuation of application No. 09/347,472, filed on Jul. 2, 1999, now abandoned, and a continuation-in-part of application No. 09/022,951, filed on Feb. 12, 1998, now abandoned, which is a continuation-in-part of application No. 08/924,230, filed on Sep. 5, 1997, now Pat. No. 6,113,173, and a continuation of application No. 08/651,921, filed on May 21, 1996, now Pat. No. 5,700,047.

(60) Provisional application No. 60/091,623, filed on Jul. 2, 1998, and provisional application No. 60/063,784, filed on Oct. 31, 1997.

(51) Int. Cl.[7] .......................................... B62D 33/02
(52) U.S. Cl. .................................. 296/26.08; 296/57.1
(58) Field of Search ........................ 296/26.08, 26.11, 296/37.6, 50, 57.1, 56, 32; 224/402–404, 496–497, 493, 314, 572, 505–506, 26.09, 26.1

(56) References Cited

U.S. PATENT DOCUMENTS

| | | | |
|---|---|---|---|
| 171,736 A | * | 1/1876 | Mooney ........................ 296/58 |
| 341,307 A | * | 5/1886 | Altschwager ............... 296/57.1 |
| 600,898 A | * | 3/1898 | Smith ........................ 296/57.1 |
| 1,242,035 A | | 10/1917 | Pierson et al. |
| 1,266,521 A | | 5/1918 | Norquist |
| 1,272,620 A | | 7/1918 | Carlson |
| 1,289,997 A | | 12/1918 | Wyeth |
| 1,655,777 A | | 1/1928 | Weiland |
| 1,655,797 A | * | 1/1928 | Peck ........................ 296/26.11 |
| 1,764,615 A | | 6/1930 | Edwards |
| D160,213 S | | 9/1950 | Samuelson |
| 2,621,357 A | | 12/1952 | Stuman |
| 2,626,179 A | | 1/1953 | Gonzalez |
| RE23,814 E | * | 4/1954 | Ingram ...................... 296/57.1 |
| 2,720,414 A | | 10/1955 | Hart |
| 2,795,363 A | | 6/1957 | Turner |
| 3,656,801 A | * | 4/1972 | Doutt et al. ............... 296/57.1 |

(List continued on next page.)

Primary Examiner—Dennis H. Pedder
(74) Attorney, Agent, or Firm—Knobbe Martens Olson & Bear LLP

(57) ABSTRACT

An improved truck bed extender particularly adapted for ease of installation and removal. When not being used to extend the truck bed, the extender is advantageously adapted to quickly and easily create a secondary storage area. In one embodiment, the extender includes a first side wall, a second side wall, a connecting wall, a first mount and a second mount. The connecting wall extends between the first side wall and the second side wall, and cooperates with the first side wall and second side wall to form a generally U-shape frame. The first mount is secured to the first side wall and includes a first interlocking member. The second mount is secured to the second side wall and comprises a second interlocking member. The first interlocking member and the first mounting station on the vehicle and the second interlocking member and the second mounting station on the vehicle cooperate to secure the truck bed extender to the vehicle so that the extender is rotatable about an axis between a first and a second position. In the first position, the connecting wall is in an upright position over the tailgate beyond the rear end of the bed. In the second position, the connecting wall is in an upright position spaced forward from the rear end of the bed and the tailgate.

3 Claims, 20 Drawing Sheets

U.S. PATENT DOCUMENTS

| | | | |
|---|---|---|---|
| 3,734,560 A | * 5/1973 | Cramblet | 296/57.1 |
| 3,902,599 A | 9/1975 | Stromberg | |
| 4,023,850 A | 5/1977 | Tillery | |
| 4,136,905 A | 1/1979 | Morgan | |
| 4,419,794 A | 12/1983 | Horton, Jr. et al. | |
| 4,451,075 A | 5/1984 | Canfield | |
| 4,470,716 A | 9/1984 | Welch | |
| 4,472,639 A | * 9/1984 | Bianchi | 296/26.11 |
| 4,531,773 A | 7/1985 | Smith | |
| 4,596,417 A | * 6/1986 | Bennett | 296/61 |
| 4,635,992 A | 1/1987 | Hamilton et al. | |
| 4,652,035 A | 3/1987 | Austin, Jr. | |
| D291,789 S | 9/1987 | Noga | |
| 4,749,226 A | 6/1988 | Heft | |
| 4,750,773 A | 6/1988 | Chapline et al. | |
| 4,778,213 A | 10/1988 | Palmer | |
| 4,786,119 A | 11/1988 | Smuda | |
| D300,734 S | 4/1989 | Kruitbosch | |
| 4,824,158 A | 4/1989 | Peters et al. | |
| 4,828,312 A | 5/1989 | Kinkel et al. | |
| 4,830,242 A | 5/1989 | Painter | |
| 5,024,409 A | 6/1991 | Bohnen | |
| 5,037,153 A | 8/1991 | Stark | |
| 5,083,829 A | 1/1992 | Fonseca | |
| D326,076 S | 5/1992 | Wiese | |
| 5,114,203 A | 5/1992 | Carnes | |
| 5,123,691 A | 6/1992 | Ginn | |
| 5,147,103 A | 9/1992 | Ducote | |
| 5,154,470 A | 10/1992 | Bringman, Jr. | |
| 5,169,200 A | 12/1992 | Pugh | |
| 5,201,562 A | 4/1993 | Dorsey | |
| 5,253,913 A | 10/1993 | Metivier | |
| 5,468,038 A | 11/1995 | Sauri | |
| D365,323 S | 12/1995 | Napierkowski et al. | |
| 5,622,296 A | 4/1997 | Pirhonen | |
| 5,658,033 A | 8/1997 | Delaune | |
| 5,700,047 A | 12/1997 | Leitner et al. | |
| 5,730,342 A | 3/1998 | Tien | |
| 5,743,589 A | 4/1998 | Felker | |
| 5,752,800 A | 5/1998 | Brincks et al. | |
| 5,755,480 A | 5/1998 | Bryan | |
| 5,765,892 A | 6/1998 | Covington | |
| 5,775,759 A | 7/1998 | Cummins | |
| 5,806,907 A | 9/1998 | Martinus et al. | |
| 5,820,188 A | * 10/1998 | Nash | 296/57.1 |
| 5,823,596 A | * 10/1998 | Kulesza | 296/26.08 |
| 5,853,116 A | 12/1998 | Schreiner | |
| 5,857,724 A | 1/1999 | Jarman | |
| 5,911,464 A | * 6/1999 | White | 296/26.11 |
| D418,106 S | 12/1999 | Leitner et al. | |
| 6,113,173 A | 9/2000 | Leitner et al. | |

\* cited by examiner

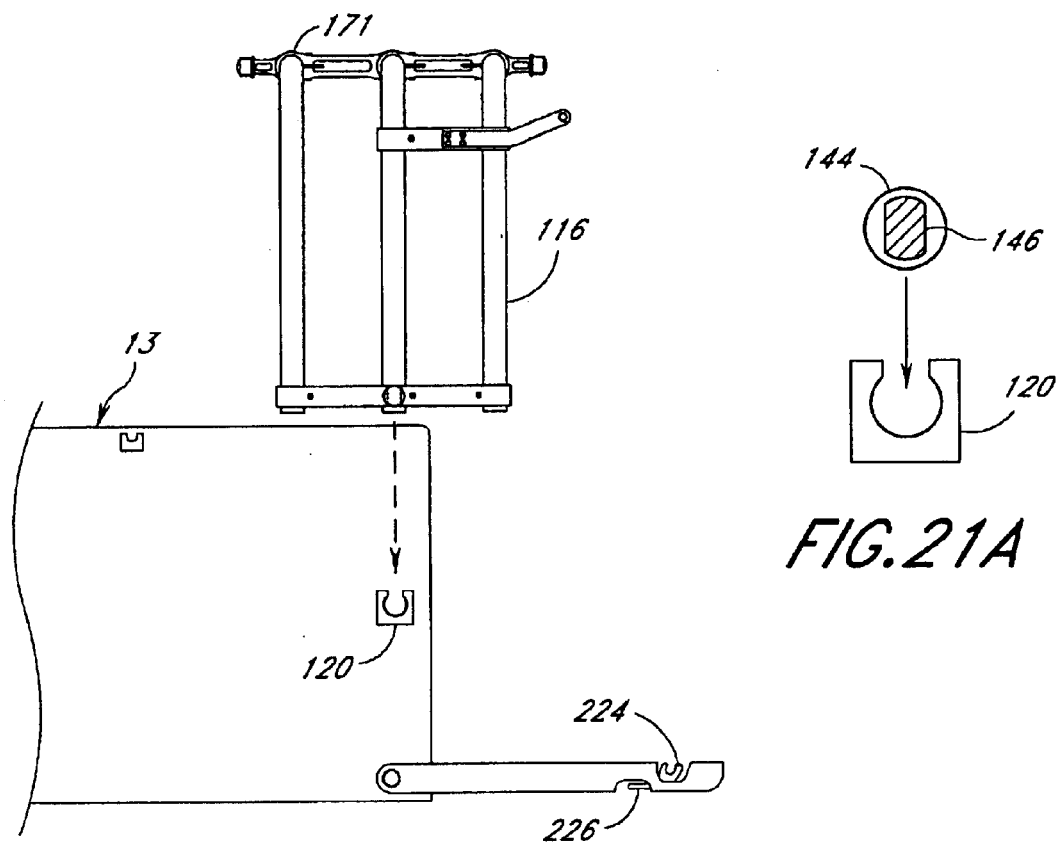
FIG.21
FIG.21A
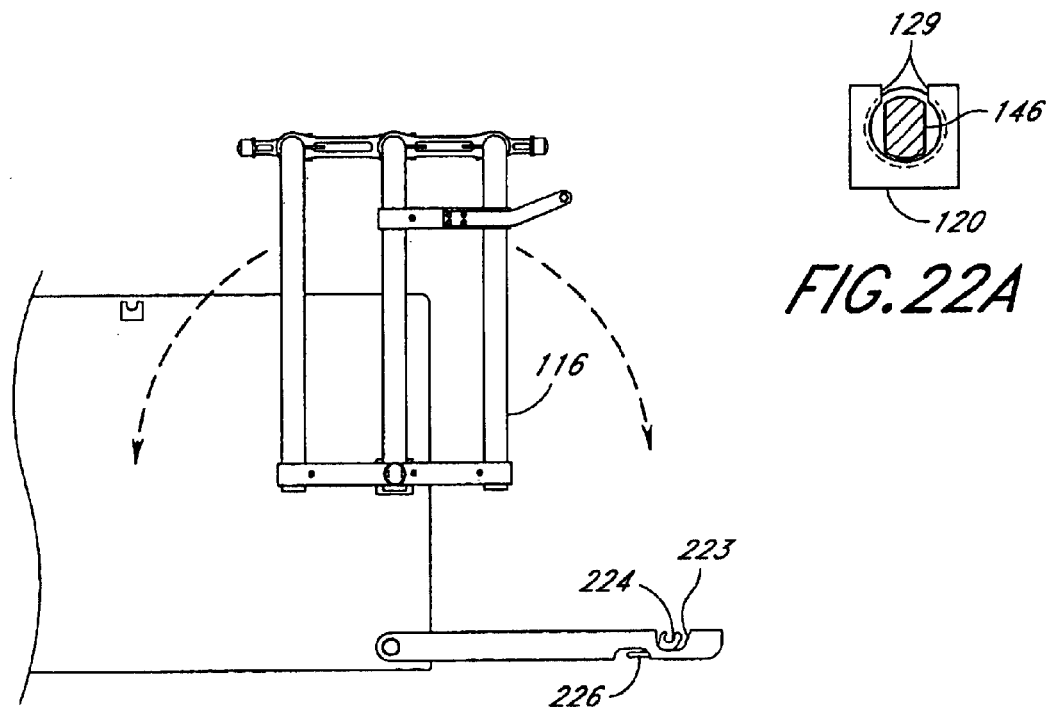
FIG.22
FIG.22A

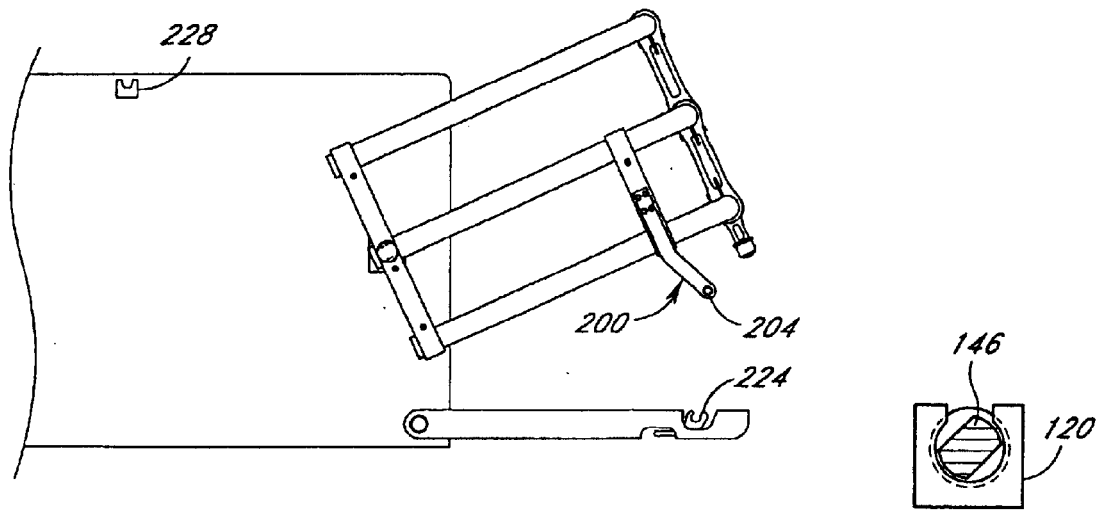
FIG.23
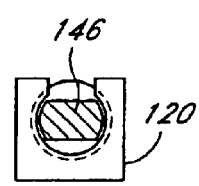
FIG.23A
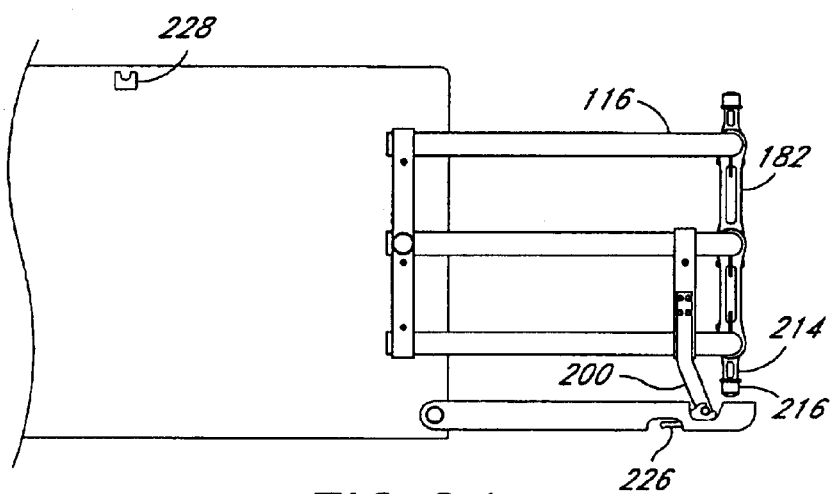
FIG.24
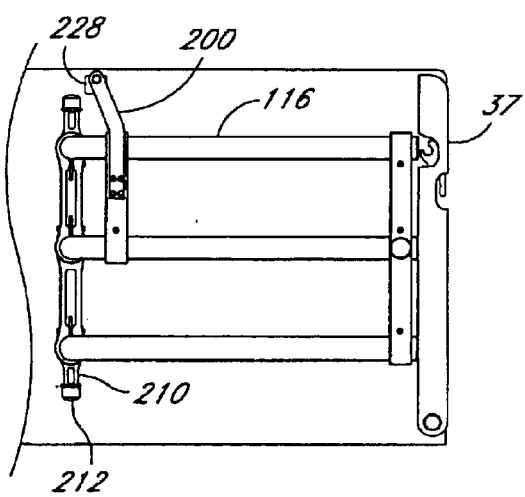
FIG.25
FIG.24A
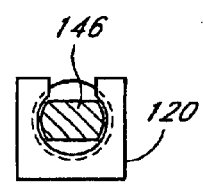
FIG.25A

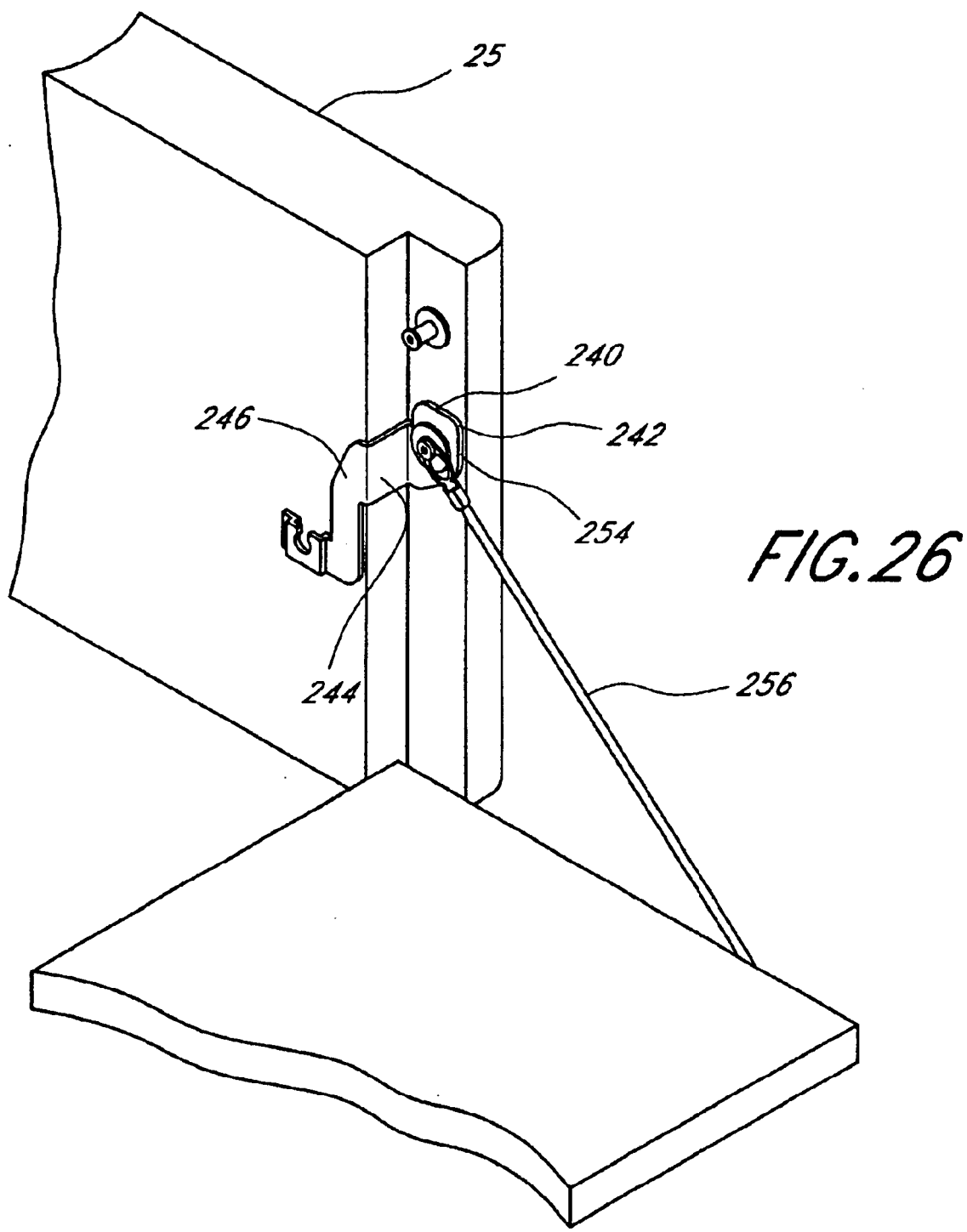

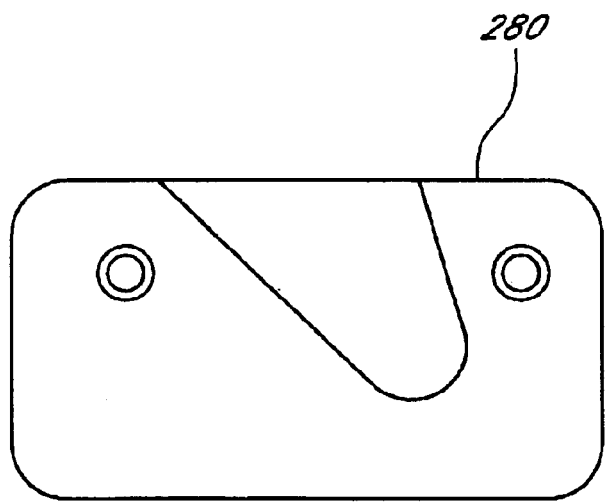
FIG.34
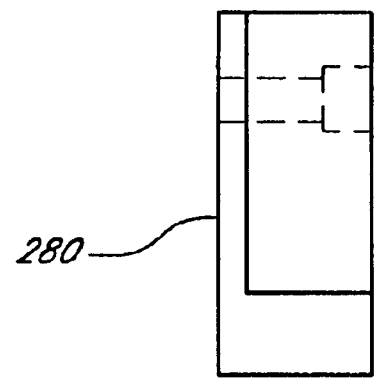
FIG.35
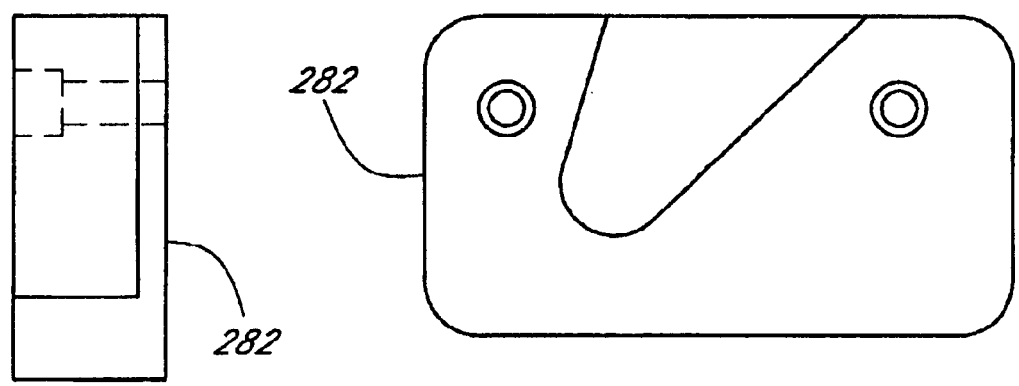
FIG.36  FIG.37

VEHICLE CARGO BED EXTENDER

FIELD OF THE INVENTION

This application is a continuation of prior U.S. patent application Ser. No. 09/524,332, filed Mar. 13, 2000, which issued as U.S. Pat. No. 6,402,215, which is a continuation of prior U.S. patent application Ser. No. 09/347,472, filed Jul. 2, 1999 and abandoned, which claims the benefit of prior U.S. Provisional Patent Application No. 60/091,623, filed Jul. 2, 1998, and is a continuation-in-part of prior U.S. patent application Ser. No. 09/022,951, filed Feb. 12, 1998 and abandoned, which is a continuation-in-part of prior U.S. patent application Ser No. 08/924,230, filed Sep. 5, 1997, which issued as U.S. Patent No. 6,113,173 and which is a continuation of prior U.S. patent application Ser. No. 08/651,921, filed on May 21, 1996, which issued as U.S. Pat. No. 5,700,047 which claims the benefit of 60/063,784 filed Oct. 31, 1997.

BACKGROUND OF THE INVENTION

Pick-up trucks are extremely popular. One of their primary advantages is the ability to haul loads in the storage bed located behind the cab of the vehicle. Unfortunately, often the storage bed is of an undesirable configuration for the load being transported. In particular, it is not unusual for the load to be larger than the truck bed, so that the tailgate of the truck needs to be lowered to enable the load to adequately transferred. Unfortunately, this raises the risk that the load will fall out of the back of the truck, or that the load will need to be tied down, taking additional time.

For this reason, various truck bed extenders have been developed. These extenders are typically mounted to the truck bed by brackets or hinges. Truck bed extenders often comprise a series of light weight panels designed to be foldable to minimize their impact on storage space when not in use, as is shown in U.S. Pat. No. 4,472,639 to Bianchi. Alternatively, the truck bed extenders may comprise strong, but relatively heavy and nonfoldable units, such as disclosed in U.S. Pat. No. 4,778,213 to Palmer. Palmer discloses extended side supports secured to the tailgate by brackets or welding and a supplemental tailgate. When the main tailgate is closed, the supplemental tailgate extends over the top of the vehicle's storage bed. It is disclosed that a flexible netting may be secured to the right and left supports so that the netting extends in a vertical plane to form a storage box.

There remains, however, a need for an improved truck bed extender.

SUMMARY OF THE INVENTION

The present invention is an improved truck bed extender which is particularly adapted for ease of installation and removal. When not being used to extend the truck bed, the extender is advantageously adapted to quickly and easily create a secondary storage area. Another aspect of the invention is a method for utilizing a truck bed extender.

One aspect of the invention is a truck bed extender for use with a vehicle having an open storage bed having a rear end, a first upstanding side panel to one side of the bed, a second upstanding side panel to an opposite side of the bed, and a tailgate, wherein the first upstanding panel defines a first mounting station and the second upstanding panel defines a second mounting station. The extender has a first side wall, a second side wall, a connecting wall, a first mount and a second mounting mount. The connecting wall extends between the first side wall and the second side wall, and cooperates with the first side wall and second side wall to form a generally U-shaped frame. The first mount is secured to the first side wall and includes a first interlocking member. The second mount is secured to the second side wall and comprising a second interlocking member. The first interlocking member and the first mounting station and the second interlocking member and the second mounting station cooperate to secure the truck bed extender to the vehicle so that the extender is rotatable about an axis between a first position and a second position. In the first position, the connecting wall is in an upright position over the tailgate rearward of the rear end of the bed. In the second position, the connecting wall is in an upright position spaced forward from the rear end of the bed and the tailgate.

Advantageously, the first mounting station comprises a first aperture and the second mounting station comprises a second aperture and the first interlocking member is a retractable male member sized and shaped to be received and retained within the first aperture and the second interlocking member is a retractable male member sized and shaped to be received and retained within the second aperture. An important aspect of the invention is that the connecting wall desirably comprises at least two interconnecting sections which are slidable relative one another permitting the horizontal span of the connecting wall to be adjusted to correspond to the particular width of the truck bed. Effective truck bed widths can vary between manufacturers and vary depending on whether a truck bed protector has been installed. Advantageously, the extender's adjustability desirably permits the identical extender to be used with most truck beds, at least in a given size classification.

The extender may also comprise a first L-shaped section defining the first side wall and a first portion of the connecting wall and a second L-shaped section defining the second side wall and a second portion of the connecting wall. Advantageously, these L-shaped portions significantly increase the strength and rigidity of the extender, enhancing its ability to withstand bumping by heavy cargo, such as motorcycles, as well as external impact.

Yet another important aspect of the invention is at least one buckle secured to one of the walls sized and shaped to be releasably locked to the latch of the vehicle tailgate. Significantly, the buckle provides a supplemental attachment point which minimizes movement and vibration of the extender while driving and is quickly releasable by using the vehicle tailgate's own opening mechanism.

Another aspect of the invention is a truck bed extender for use with a vehicle having a storage bed. The extender includes a first side wall, a second side wall, a connecting wall, a first mount and a second mount. The connecting wall extends between the first wall and the second wall and cooperates with the first wall and second wall to form a general U-shaped frame. The first mount is secured to the first side wall and includes a first interlocking member. The second mount is secured to the second wall and includes a second interlocking member. The extender is securable to the vehicle through cooperation of the first interlocking member and the first mounting station and the second interlocking member and the second mounting station in a first position wherein the connecting wall is in an upright position over the tailgate rearward of the rear end of the storage bed and a second position wherein the connecting wall is in an upright position spaced forward from the rear end of the bed and the tailgate.

Yet another important aspect of the invention is a truck bed extender for use with a vehicle having a first side panel defining a first forward mounting station and a first rearward mounting station, and a second panel defining a second forward mounting station and a second rearward mounting station, wherein the extender includes a first side wall, a second side wall, a connecting wall, a first mount and a second mount. The connecting wall extends between the first side wall and the second side wall, and cooperates with the first side wall and the second side wall to form a generally U-shaped frame. The first mount is secured to the first side wall and includes a first interlocking member. The second mount is secured to the second side wall and comprises a second interlocking member. The extender is securable to the vehicle through cooperation of: (1) the first interlocking member and the first forward station and the second interlocking member and the second forward station in a first position wherein the first side wall and the second side wall extend forward of the connecting wall and the connecting wall is in an upright position spaced rearward from the front panel, and (2) the first interlocking member and the first rearward station, and the second interlocking member and the second rearward station in a second position wherein the connecting wall is in an upright position spaced rearward from the rear end of the bed over the tailgate.

Desirably, the extender is also securable to the vehicle through cooperation of the first interlocking member and the first rearward station and the second interlocking member and the second rearward station in a third position, wherein the connecting wall is in an upright position spaced forward from the rear end of the bed and the tailgate.

As will be readily apparent to one of skill in the art, another aspect of the invention is a method of mounting a truck bed extender on a vehicle.

Yet another aspect of the invention is a truck bed extender for use with a vehicle having an open storage bed having a rear end, a first upstanding side panel to one side of the bed having an inner side, a second upstanding side panel to the opposite side of the bed having an inner side, and a tailgate. A first mounting station fixed with respect to the first upstanding panel defines a first station surface and a second mounting station fixed with respect to a second upstanding panel defines a second station surface. The bed extender comprises a first sidewall, a second sidewall, a connecting wall, a first mount and a second mount. The connecting wall extends between the first sidewall and the second sidewall. The first sidewall, the second sidewall and the connecting wall cooperate to form generally u-shape frame having a first open side and a second open side. The first mount is on the first sidewall and comprises a first interlocking member defining a first mount surface. The second mount is on the second sidewall and comprises a second interlocking member defining a second mount surface. The first station surface and the first mount surface, and the second station surface and the first mount surface cooperate to secure the apparatus to the vehicle so that the apparatus is in an upright position over the tailgate rearward of the rear end of the bed with the first open side facing away from the tailgate and the second open side facing toward the tailgate. One of the first station surface and the first mount surface defines a first opening through which the other of the first station surface and the first mount surface can be manually withdrawn from the inner side of the first panel to disengage the extender from the first panel. One of the second station surface and the second mount surface defines the second opening through which the other of the second station surface and the second mount surface can be manually withdrawn from the inner side of the second panel to disengage the extender from the second panel.

Desirably, the extender is rotatable about an axis between a first position wherein the connecting wall is in a substantially vertical position over the tailgate rearward of the rear end of the bed and the first mount cooperates with the first station and the second mount cooperates with the second station to secure the assembly against movement radial to the axis, and a second position wherein the connecting wall is in a nonvertical position and the first mount cooperates with the first station and the second mount cooperates with the second station to permit the assembly to be moved full radially with respect to the axis.

Another aspect of the invention is a method for an individual to mount a vehicle bed extender on a vehicle without tools including: ( ) aligning a first mount fixed with respect to the extender with a first space defined by the first station and aligning a second mount fixed with respect to the extender with a second space defined by the second station; ( ) moving the bed extender such that the first mount moves radially through the first space with respect to an axis defined by the first station and the second station and the second mount moves radially with respect to the axis through the second space; and ( ) pivoting the extender about the axis so that the first mount cooperates with the first station and the second mount cooperates with the second station to prevent radial movement of the first mount with respect to the axis and the second mount with respect to the axis.

Yet another aspect of the invention is the method for an individual to mount a vehicle bed extender on a vehicle without tools, including: ( ) grasping the bed extender in the first location with one hand; ( ) grasping the bed extender in a second location spaced from the first location with another hand; ( ) while continuing to grasp the extender with the first hand and the second hand, aligning the first mount with a first space defined by the first station and aligning a second mount with a second space defined by the second station; and ( ) while continuing to grasp the extender with the first hand and the second hand, moving the bed extender such that the first mount moves through the first space defined by the first station and the second mount moves through the second space defined by the second station.

Yet another aspect of the invention is the truck bed extender for use with a vehicle having an open storage bed having a rear end, a first standing side panel to one side of the bed, a second upstanding side panel to an opposite side of the bed and a tailgate, a first mounting station fixed with respect to the first upstanding panel defining a first station surface and a second mounting station fixed with respect to the second upstanding panel defining a second station surface. The extender includes a first sidewall, a second sidewall, a connecting wall extending between the first sidewall and the second sidewall, a first mount secured to the first sidewall, and a second mount secured to the second sidewall. The first sidewall of the second sidewall and the connecting wall cooperate to form a generally u-shaped frame. The first mount defines a first mount surface and the second mount defines a second mount surface. The first station surface and the first mount surface, and the second station surface and the first mount surface cooperate to secure the apparatus to the vehicle so that the connecting wall is in an upright position over the tailgate rearward of the rear end of the bed. The tailgate defines a latch to secure the tailgate to at least one of the first upstanding panel and the second upstanding panel. The truck bed extender further includes at least one interlock member secured to one of the walls sized and shaped to be releasably captured by the latch of the tailgate. Desirably, the interlock member comprises a buckle or a cylindrical interlock portion rigidly secured to the connecting wall. Significantly, this stabilizes the tailgate against movement when the vehicle strikes an object, such as a speed bump.

Yet another aspect of the invention is a truck bed extender for use with the vehicle having an open storage bed having a rear end, a first upstanding side panel to one side of the bed, a second upstanding side panel to an opposite side of the bed and a tailgate, a first forward mounting station fixed with respect to the first panel, a second forward mounting station fixed with respect to the second panel, a first rearward mounting station fixed with respect to the first panel and a second rearward mounting station fixed with respect to the second panel. The apparatus includes a first sidewall, a second sidewall, a connecting wall extending between a first sidewall and the second sidewall, a first mount secured to the first sidewall and the second mounts secured to the second sidewall. The first sidewall, and the second sidewall and the connecting wall cooperate to form a generally u-shaped frame. The first mount comprises a first interlocking member and the second mount comprises a second interlocking member. The extender is mountable in a first position wherein the connecting wall is in a substantially vertical position spaced above the tailgate rearward of said rear end of said bed, and a second position wherein the connecting wall is in a substantially vertical position forward of the rear end of the bed and spaced above the rear end of the bed.

Finally, yet another aspect of the invention is the truck bed extender for use with the vehicle having an open storage bed having an open end, first upstanding side panel to one side of the bed having an inner side having a lower end and an upper end, a second upstanding side panel to an opposite side of the bed having an inner side and a tailgate, a first mounting station fixed with respect to the first upstanding panel defining a first station surface, and a second mounting station fixed with respect to the second upstanding panel defining a second station surface. The apparatus includes a first sidewall, a second sidewall, a connecting wall extending between the first sidewall and the second sidewall, a first mount on the first sidewall and a second mount on the second sidewall. The first sidewall, the second sidewall and the connecting wall cooperate to form a generally u-shape frame having a first open side and a second open side. The first mount comprises a first interlocking member defining a first mount surface and the second mount comprises a second interlocking member defining a second mount surface. The first station surface and the first mount surface, and the second station surface and the first mount surface cooperate to secure the apparatus to the vehicle so that the apparatus is in an upright position over the tailgate rearward of the rear end of the bed with the first open side facing away from the tailgate and the second open side facing toward the tailgate. One of the first station surface and the first mount surface defines a first opening through which the other of the first station surface and the first mount surface can be withdrawn from the inner side of the first panel to disengage the extender from the first panel. One of the second station surface and the second mount surface defines a second opening through which the other of the second station surface and the second mount surface can be withdrawn from the inner side of the second panel to disengage the extender from the second panel. The first mount forms a single piece with a portion of the wall extending at least the majority of the distance between the upper end and the lower end of the first panel.

BRIEF DESCRIPTION OF THE DRAWINGS

These and other features of the invention will now be described in connection with the accompanying drawings, in which:

FIGS. 21–25 are schematic views illustrating the mounting of the extender of FIG. 18.

FIGS. 21a–25a are corresponding schematic views illustrating the position of the bracket and male member during the mounting of the extender of FIG. 18.

FIG. 26 illustrates an alternative mount, which avoids the need for drilling of additional holes in the vehicle.

FIGS. 34–37 illustrate an alternative holder pair.

DETAILED DESCRIPTION OF THE PREFERRED EMBODIMENT

Figure 1:
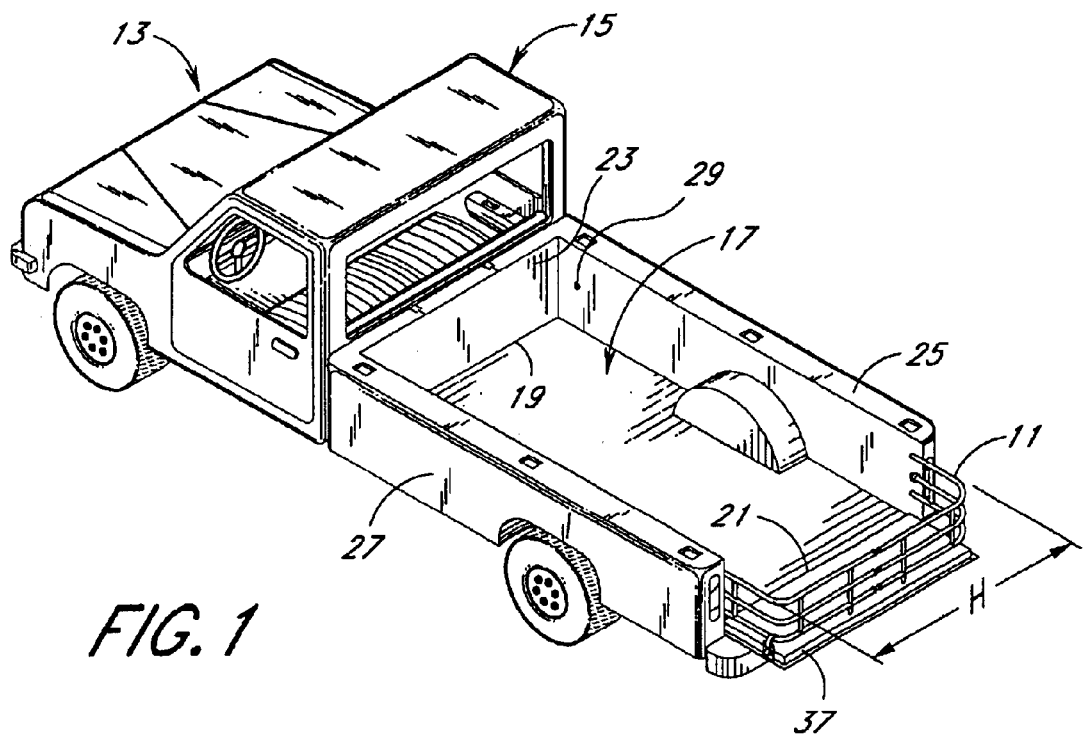
FIG. 1 is a perspective view of a preferred embodiment of the truck bed extender of the present invention mounted on a vehicle in a first position.
Figure 2:
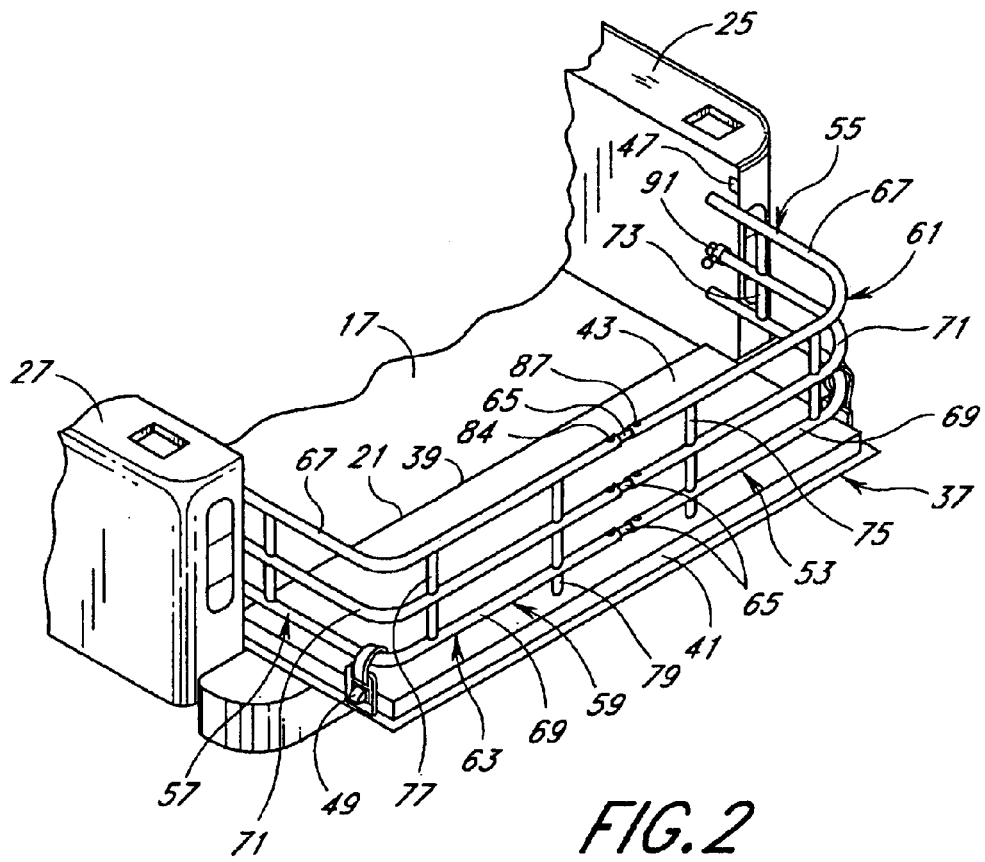
FIG. 2 is a enlarged partial perspective view of the vehicle and truck bed extender of FIG. 1.
Figure 3:
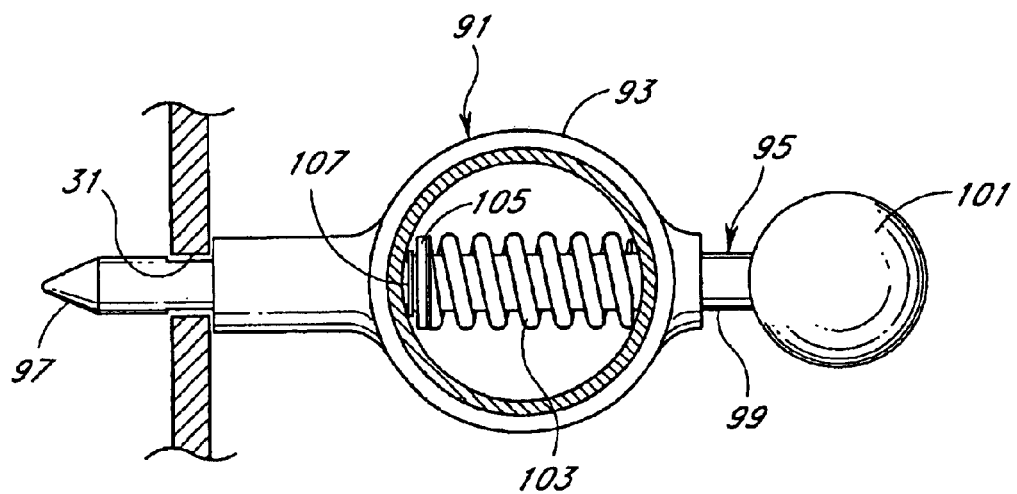
FIG. 3 is an enlarged sectional view of the mount of the truck bed extender of FIG. 1.

The preferred embodiment of a multi-purpose apparatus or truck bed extender 11 will now be described with reference to the figures. Referring to FIGS. 1 and 2 the truck bed extender 11 is shown mourned on a truck 13 having a cab 15 to the rear of which is a storage bed 17. The storage bed 17 has a front end 19 and a rear end 21. The front end 19 of the storage bed is defined by a front upstanding panel 23 and the sides of the storage bed are defined by a first side upstanding panel 25 and a second side upstanding panel 27. The first side upstanding panel 25 defines a first forward mounting station or aperture 29 and a first rearward mounting station or aperture 31 (FIG. 3), the purpose and location of which will be discussed in greater detail below. Likewise, the second side upstanding panel 27 defines a second forward aperture (not shown) and a second rearward aperture (not shown).

At the rear end 21 of the storage bed 17 is a tailgate 37. The tailgate has a hinge end 39 and a distal end 41. The tailgate 37 defines a planar inner surface 43 extending between the hinge end 39 and distal end 41 of the tailgate. The tailgate 37 further comprises a first lock mechanism (not shown) which mates with a first latch 47 mounted on the rear end of the first upstanding panel 23. A tailgate 37 further includes a second lock mechanism 49 which interlocks with a second latch (not shown) mounted on the second side upstanding panel 27. The first lock mechanism and second lock mechanism 49 are selectably releasable by means of a release actuator (not shown) mounted at the outer surface of the distal end of the tailgate.

The truck bed extender 11 includes a frame 53 having a first side wall 55, a second side wall 57 and a connecting wall 59 extending between the first side wall 55 and second side wall 57. The frame 53 and, therefore, the connecting wall 59 define a horizontal span H which is slightly less than the distance between the first side upstanding panel 25 and second side upstanding panel 27 of the truck 13. The frame 53 is formed by a first L-shaped section 61, a second L-shaped section 63 and a plurality of connecting sections 65.

Both L-shaped sections 61, 63 comprise a generally L-shaped upper cross-beam 67, a generally L-shaped lower cross-beam 69 and a generally L-shaped middle cross-beam 71. Advantageously, each cross-beam comprises a single piece of 1.5 inch outer diameter, 0.058 inch wall thickness, 6061-T6 aluminum tubing.

The cross-beams 67, 69 and 71 are advantageously connected by an outer vertical strut 73, an inner vertical strut 75 and a middle vertical strut 77. The struts 73, 75, 77 desirably extend through mating openings in the cross-beams 67, 69, 71 and comprise one inch outer diameter, 0.058 inch wall thickness, 6061-T6 aluminum tubing. The use of angled aluminum tubing provides for high strength, low weight and ease of manufacture.

As shown in FIG. 2, the inner strut 75 and middle strut 77 are desirably positioned along the connecting wall 59 and the outer strut 73 is desirably positioned along the distal end of the side wall. Advantageously, the inner strut 75 is longer than the other struts and projects downward from the lower crossbeam 69 so as to define an inner strut foot 79.

The first L-shaped section 61 and second L-shaped section 63 are connected by the plurality of connecting sections 65. Specifically, there is an upper connecting section, a lower connecting section and a middle connecting section. Desirably, the connecting sections comprise a 7 inch long, 1-⅜ inch outer diameter, 0.058 inch wall thickness, 6061-T6 aluminum tube. The connecting sections are slidable within and, desirably forms a slip-fit with, the first L-shaped section 61 and second L-shaped section 63, and are each desirably locked in place by a pair of locking screws 87.

Figure 4:
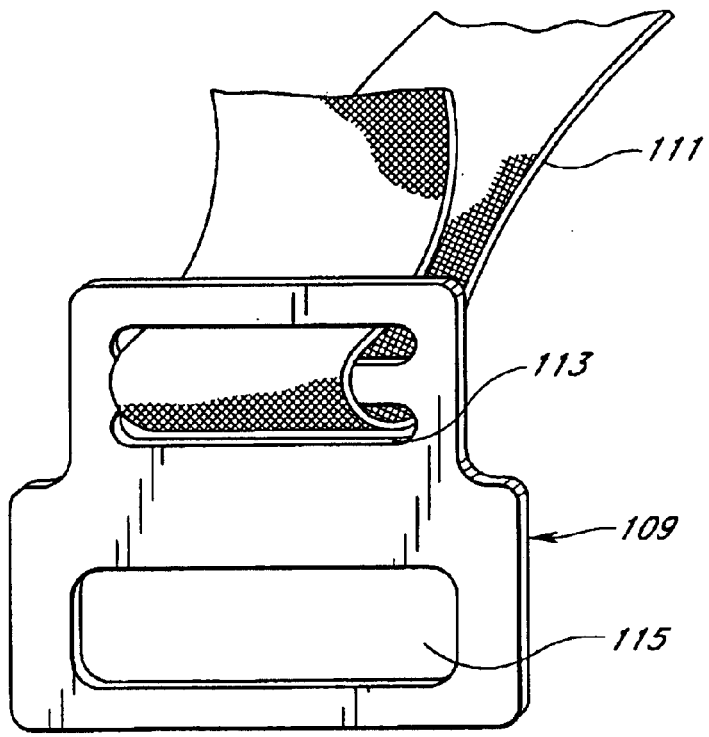
FIG. 4 is an enlarged perspective view of a belt and buckle locking device of the truck bed extender of FIG. 1.

Approximately ⅝ inch from the outer end of each middle crossbeam 71 is a 0.328 inch diameter horizontal bore mounted over the middle crossbeam 71 aligned with the bore is a mount 91 having a body 93 which defines a throughbore. The body has an annular middle portion with generally diametrically opposed cylindrical projections corresponding to the throughbore. The mounts 91 are secured respectively to the first L-shaped section and second L-shaped section so that the throughbores are coaxially aligned. The mount 91 further includes a generally cylindrical male member 95 having a cone-shaped engagement end 97 and an actuating end 99. A handle 101 is threaded on the actuating end 99 and the male member 95 is mounted for reciprocal movement within the body by a spring 103 surrounding the male member within the body 93 of the mount. The precompressed spring desirably has one end biased against the body 93 of the mount and another end which is biased against a washer 105 which is secured against outward movement relative the male member 95 by a C clip 107. Referring now to FIG. 2, a buckle 109 is secured to each of the lower crossbeams 69 by means of a strap 111. As shown in FIG. 4, the buckle 109 is generally rectangular with a narrower upper portion and a wider lower portion. The buckle 109 desirably forms a pair of parallel slots 113 for receiving the strap 111 and a larger opening 115 for mating with one of the lock mechanisms 49 of the vehicle.

The installation and operation of the truck bed extender 11 will now be described.

When it is desired to ready a vehicle for use with the truck bed extender 11, the truck bed extender 11 can be placed in the desired position on the tailgate 37 so that the distal end of the first side wall 55 and distal end of the second side wall 57 extend along the inner surface of the rear end of the first side upstanding panel 25 and the second side upstanding panel 27, respectively. When the truck bed extender 11 is in the desired position, its width can be adjusted by sliding the first or second L-shaped sections 61 and 63 relative the connecting section 65 and securing it in position by means of one of the locking screws 87. Once the extender 11 has been adjusted so that it has the desired horizontal span H, the handle 101 of each of the mounts 91 can be pressed outward so that the engagement end 97 of the male member 95 presses hard against the respective first side upstanding panel 25 and second side upstanding panel 27 to mark the location for drilling the first rearward aperture 31 and second rearward aperture 35. This approach eliminates difficulties in determining the proper position of the apertures 31 and 35. Once the first rearward aperture 31 and second rearward aperture 35 are drilled into the first side upstanding panel 25 and second side upstanding panel 27, respectively, the truck bed extender 11 is ready for operation. Importantly, no additional brackets or modifications are required, so that when the truck bed extender is not in use, there are no brackets in the way, and virtually no cosmetic change to the appearance of the truck 13.

In use, the truck bed extender is simply positioned on the tailgate 37 so that the engagement ends 97 of the mounts 91 extend through the respective first rearward mounting station or aperture 31 and second rearward mounting station or aperture (not shown). The surface of each mount 91 (mount surface engages the surface of each mounting station 31

(station surface). In this position, the truck bed extender provides a strong, secure retaining device while the openings between the respective crossbeams and struts permit the flow of air to minimize air resistance. If it is desired to remove the truck bed extender 11, the handles 101 secured to each of the male members 95 are simply pulled inward causing engagment ends 97 of the male members 95 to retract from the first rearward aperture 31 and second rearward aperture 35 and the truck bed extender can be removed.

The truck bed extender can be further secured against undesired rotation about the mounts 91 by means of the buckle 109 and strap 111, by simply securing the buckles 109 in the first lock mechanism (not shown) and second lock mechanism 49, respectively, of the tailgate 37. Advantageously, the buckles are configured so that they are secured in place by the lock mechanisms and are selectably releasable by the tailgate's own release actuator.

Figure 5:
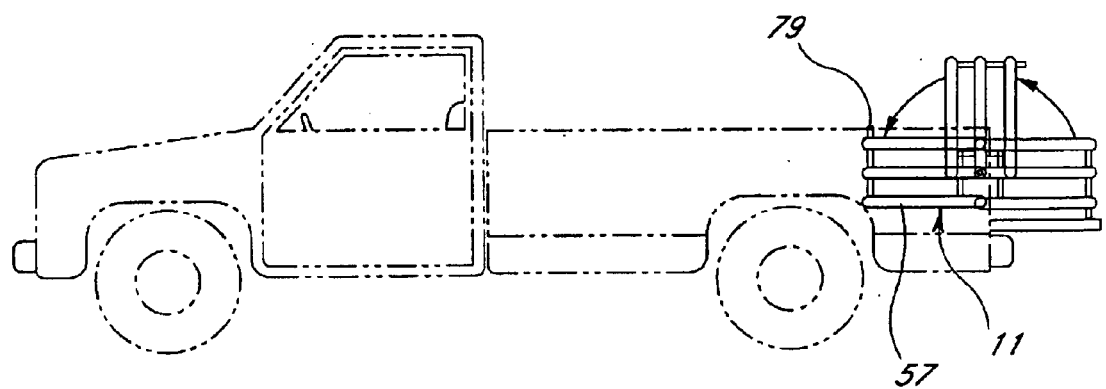
FIG. 5 is a partial sectional view illustrating the pivoting of the truck bed extender of FIG. 1 from a first position (shown in phantom) to a second position.
Figure 6:
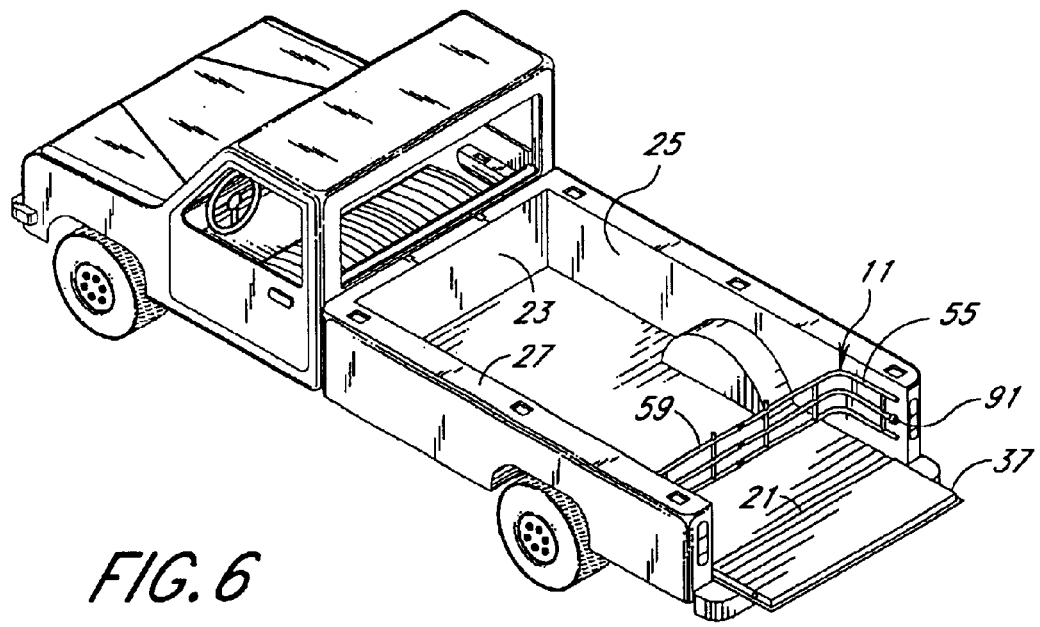
FIG. 6 is a top plan view of the truck bed extender and vehicle of FIG. 1 in a second position.

Importantly, in the event it is desired to use the truck bed extender 11 to form a rear storage compartment, as shown in FIG. 5, the truck bed extender can be quickly and easily pivoted about the coaxial male members 95 so that the connecting wall 59 is in a vertical position spaced inward from the rear end 21 of the storage bed 17 and, therefore, the tailgate 37. In this position, the truck bed extender 11 provides a convenient open upper-ended storage compartment to secure grocery bags or other items against movement within the truck bed.

Advantageously, the truck bed extender 11 is extremely strong, but at the same time lightweight. In addition, because its structural configuration lends itself to construction with a minimum of parts, the extender can be manufactured at a relatively low cost.

Figure 7:
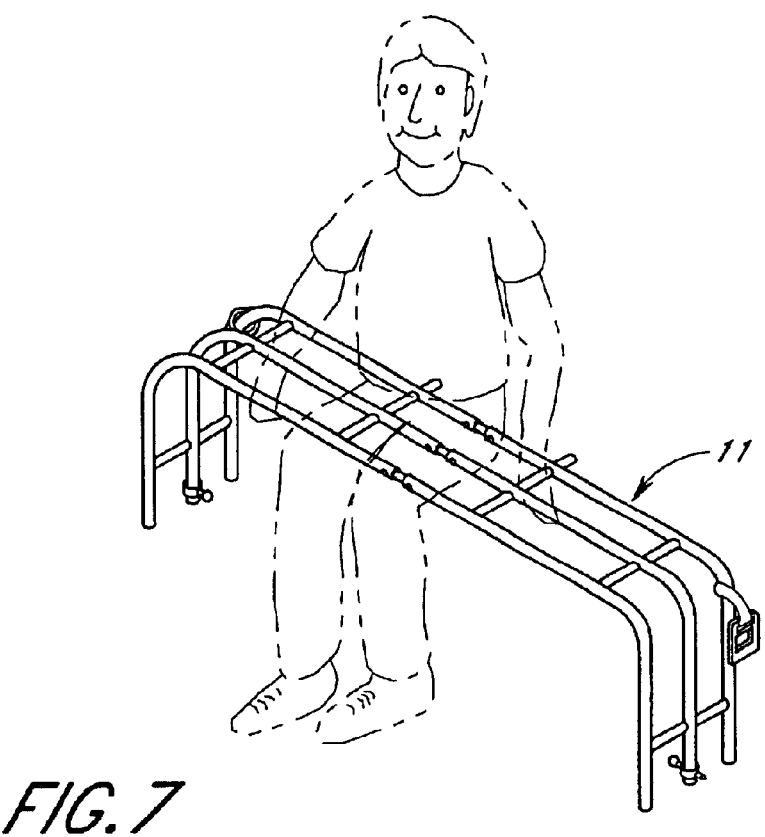
FIG. 7 is a perspective view of the truck bed extender of FIG. 1 illustrating its use as a bench.

Advantageously, as shown in FIG. 7, the truck bed extender provides a convenient work or picnic bench when it is removed from the vehicle. Specifically, when the distal ends of the first side wall 55 and second side wall 57 are placed on the ground, one or more individuals can sit on the connecting wall 59.

Figure 8:
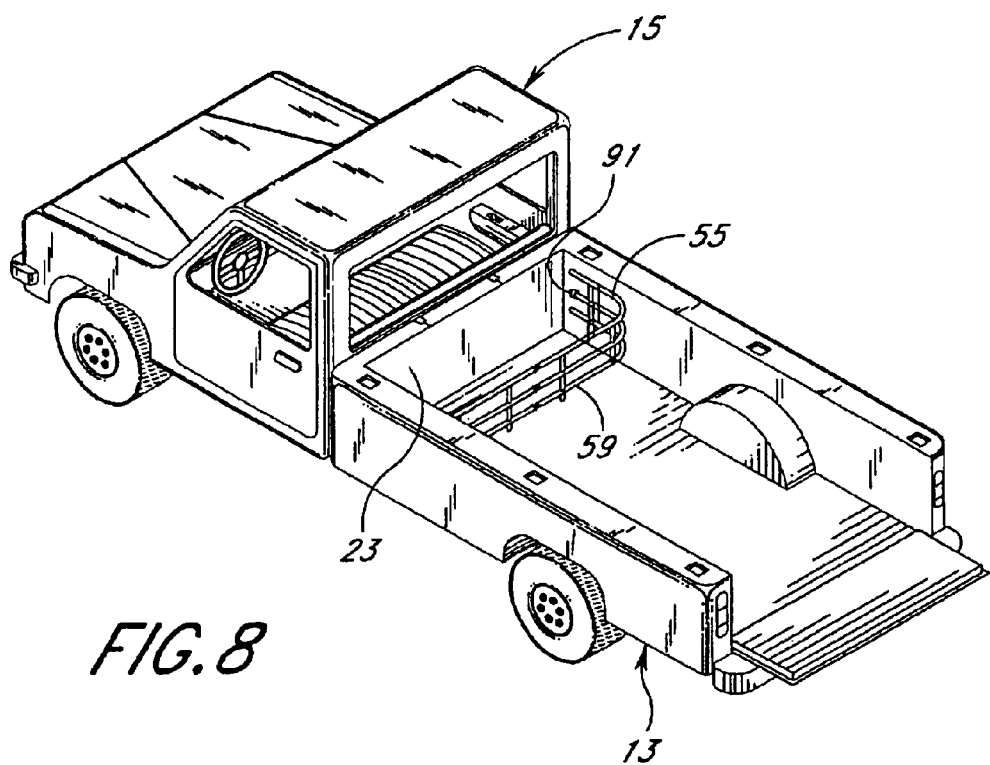
FIG. 8 is a perspective view of the truck bed extender and vehicle of FIG. 1 showing the truck bed extender in a third position.

Finally, as shown in FIG. 8, the truck bed extender 11 is also capable of forming a forward storage compartment adjacent the cab 15 of the truck 13. Such a position is often desirable when transporting pets, due to the proximity to the driver and the wind resistance afforded by the cab 15. If it is desired to use the truck bed extender to form such a forward storage compartment, a first forward aperture 29 and a second forward aperture (not shown) are desirably formed in the first side upstanding panel 25 and second side upstanding panel 27, respectively by locating and drilling the apertures in a manner similar to that of the rearward apertures 31 and 35. It is then a simple matter to place the truck bed extender 11 in position so that the first side wall 55 and second side wall 57 extend forward from the connecting wall so that the connecting wall 59 is spaced rearward from the front upstanding panel 23 of the truck 13. Again, removal is easily accomplished by simply pulling the handles 101 inward so that engagement ends 97 the male members 95 are retracted within the mounts 91 so that they are withdrawn from the first forward aperture 29 and second forward aperture (not shown).

Figure 9:
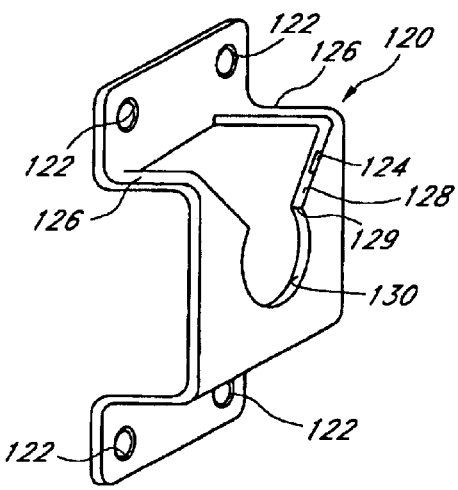
FIG. 9 is a perspective view of a female element or bracket of a mounting mechanism for the extender, in accordance with a second preferred embodiment of the present invention.
Figure 10:
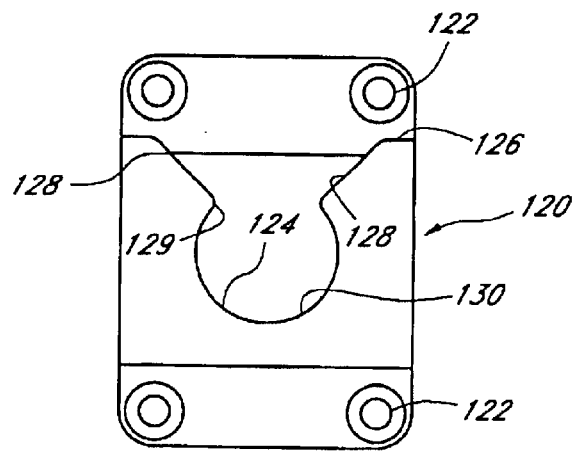
FIG. 10 is a front elevational view of the bracket of FIG. 9.
Figure 11:
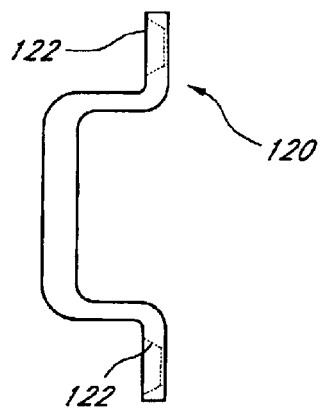
FIG. 11 is a side elevational view of the bracket of FIG. 9.

Referring now to FIGS. 9 to 11, a mounting station, such as a female member or bracket 120 is illustrated in accordance with a second preferred embodiment. The bracket 120 includes a plurality of screw holes 122 which facilitate mounting the bracket 120 to the panels 25, 27 (FIG. 1) of the truck 13. Preferably, four such brackets 120 are mounted by screws through the screw holes 122 to the panels 25, 27 at positions centered about positions of the forward aperture 29 and rearward aperture 31 of the first embodiment (FIGS. 1–8).

The mounting station or bracket 120 has an upper edge 124 which defines an aperture or slot with an upper opening and a relatively more narrow lower opening. In the illustrated embodiment, the edge 124 includes a pair of generally horizontal upper surfaces 126. A pair of slanted portions 128 extend inwardly and downwardly from the horizontal portion 126, each terminating at a cusp 129. A lower curved portion 130 defines a generally circular upper station surface and extends downwardly from and joins the cusps 129 to one another.

Advantageously, the curved portion 130 defines greater than 180E of a circle, and is illustrated defining about 300E of a circle. Accordingly, the slot defined by the upper edge 124 is more narrow at the cusps 129 than at the widest point of the curved portion 130 below.

Figure 12:
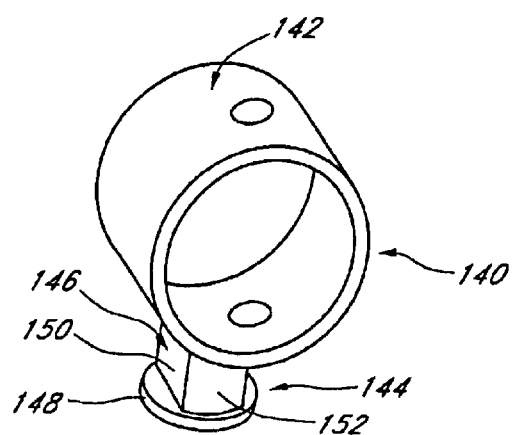
FIG. 12 is a perspective view of a mount, including a male element, of the mounting mechanism of the second embodiment.

With reference to FIG. 12, a mount 140 is shown, including a body 142 which defines a generally horizontal cylindrical bore. As with the mount 91 of the first embodiment (FIG. 3), a mount 140 can be fitted over each middle crossbeam 71 (FIG. 2) approximately ⅝ inch from the outer end.

A male element 144 extends from the body 142. The male element 144, in turn, includes an axle portion 146 and a relatively wider locking portion 148, illustrated as a disk. The axle portion 146 has two generally horizontal, opposed flat sides 150 and two opposed curved sides 152 (one of each shown). The maximum spacing between the opposed flat side 150 defines a first width of the axle portion 146. The first width is less than the spacing between the cusps 129 on the bracket 120 (FIGS. 9–11). The maximum spacing between the opposed curved sides 152 define a second width between them, where the second width is greater than the spacing between the cusps 129 on the bracket 120. Preferably, the curved sides 152 have the same curvature as the curved portion 130 of the mounting station bracket 120 (FIGS. 9–11) with a slightly smaller radius of curvature, such that the surface of the curved sides 152 defines a mount surface that engages the station surface of the mounting station or bracket 120.

The extender of the second preferred embodiment (not shown) will resemble the extender 11 of FIG. 2, except including a mount 140 at the end of each middle cross-beam. Accordingly, the following discussion will refer to components of second preferred embodiment by reference numerals assigned to like components of the first preferred embodiment (FIGS. 1–8).

In mounting the extender 11 to the truck 13 (which already has brackets 140 mounted thereto), a user can lift the extender 11 with the connecting wall 59 facing up and the side walls 55, 57 extending downwardly. The axle portions 146 are then aligned with the slots of the brackets 140. In this position, the flat sides 150 of the axle portions 146 are generally vertical. The extender 11 is then lowered. Since the first width is narrower than the spacing between the cusps 129 of the bracket 120, each axle portion 146 fits between the cusps 129 of a corresponding bracket 120. The 148 fits into the wider upper opening defined by the horizontal upper surfaces 126.

As the extender 11 is lowered, a curved side 152 of the male element 144 contacts the curved portion 130 of the corresponding female element or bracket 120. The extender 11 is then rotated outward or inward about 90E (see FIG. 5).

The curved sides 152 of the axle portions 146 mate with and journal within the curved portion 130 of the bracket 120. When thus rotated, the cusps 129 prevent the axles 146 from lifting out of brackets 120, as will be understood by one of skill in the art. To remove the extender 11, the extender 11 must be rotated until the flat sides 150 of the axle portions 146 are approximately vertical, and can slip past the cusps 129 on the brackets 120.

Advantageously, the extender 11 of the second preferred embodiment can be installed or removed without retracting any locking mechanism and without scratching the paint on the interior of the truck bed 17. Accordingly, the users hands can be used solely to lift and rotate the extender 11.

Figure 13:
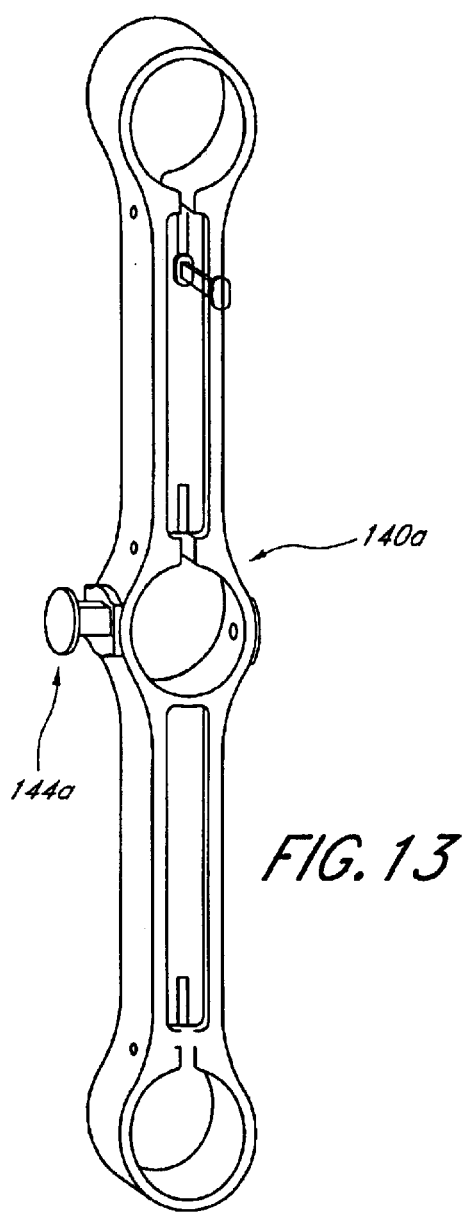
FIG. 13 is a perspective view of a combination mount and strut in accordance with a third preferred embodiment.
Figure 14:
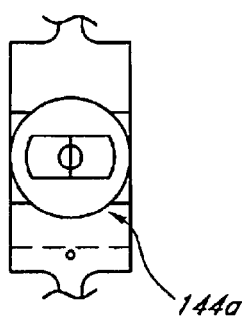
FIG. 14 is an end elevational view of a male element of the mount and strut of FIG. 13.

With reference to FIGS. 13 and 14, a combination mount and strut 140a is shown with a male element 144a, which can be similar to the male element 144 of FIG. 12. By performing both functions of supporting the cross-beams and mounting the extender, this combination mount and strut 140a can simplify the extender design and reduce part numbers.

Figure 15:
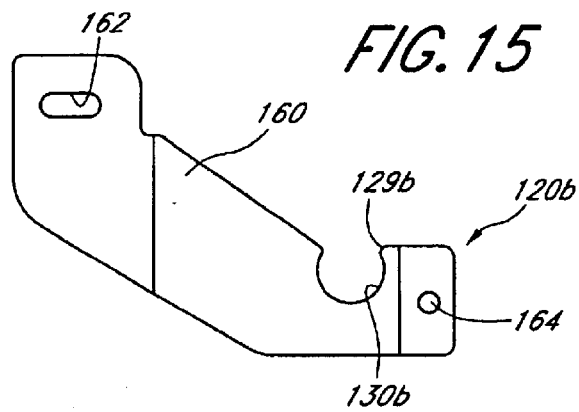
FIG. 15 is a front elevational view of an alternative female element or bracket for use with the mounts of FIG. 12 or 13.

With reference to FIG. 15, an alternative female mounting element or bracket 120b is shown, including an upwardly extending arm 160, a left screw hole 162, and right screw hole 164 for mounting the bracket 120b to a truck panel 27. It will be understood that a second bracket would be provided in a mirror image of that illustrate for the opposite panel 25 of the truck. The arm 160 is oriented such that a curved portion 130b (in which a male mounting element can journal) is appropriately positioned while the left screw hole 162 aligns with a pre-existing screw hole in the truck panel 25 or 27, such as the lower hole for the tailgate latch mechanism 47. This arrangement advantageously reduces the number of screw holes required to be drilled in the truck panels, while still fixing the bracket 120b in a unique position.

Furthermore, it is possible that the arm 160 could be extended further upward, and another screw hole provided in alignment with the upper latch screw of the tailgate latch mechanism 47, thereby eliminating any need for a right screw hole.

Figure 16:
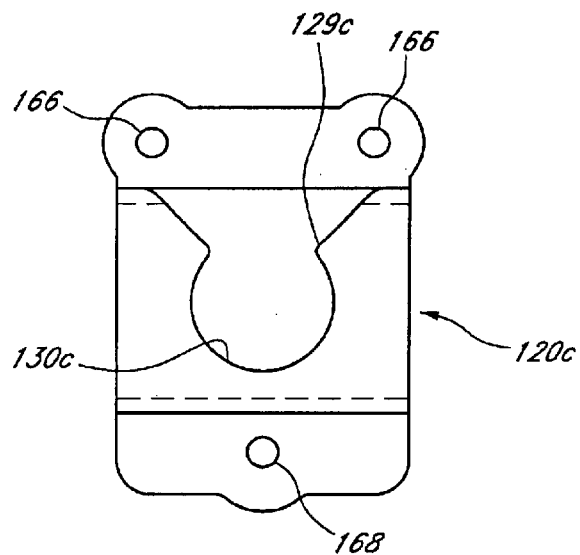
FIG. 16 is front elevational view of another alternative female element or bracket for use with the mounts of FIG. 12 or 13.
Figure 17:
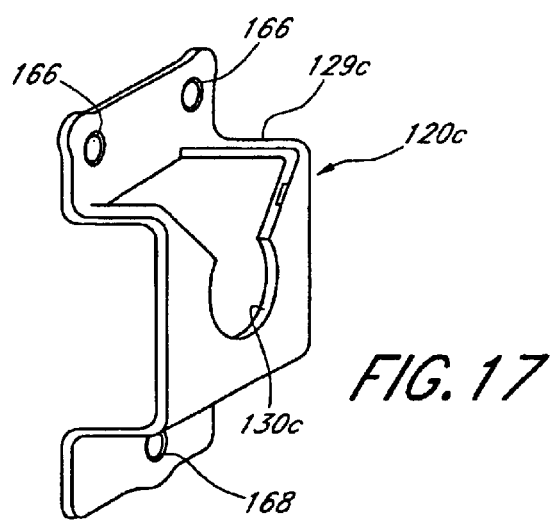
FIG. 17 is a perspective view of the bracket of FIG. 16.

FIGS. 16 and 17 illustrated yet another bracket 120c, having two upper screw holes 166 and one lower screw hole 168. It will be recognized that this arrangement reduces by one the number of screw holes required to be drilled, relative to the bracket 120 of FIGS. 9–11.

Figure 18:
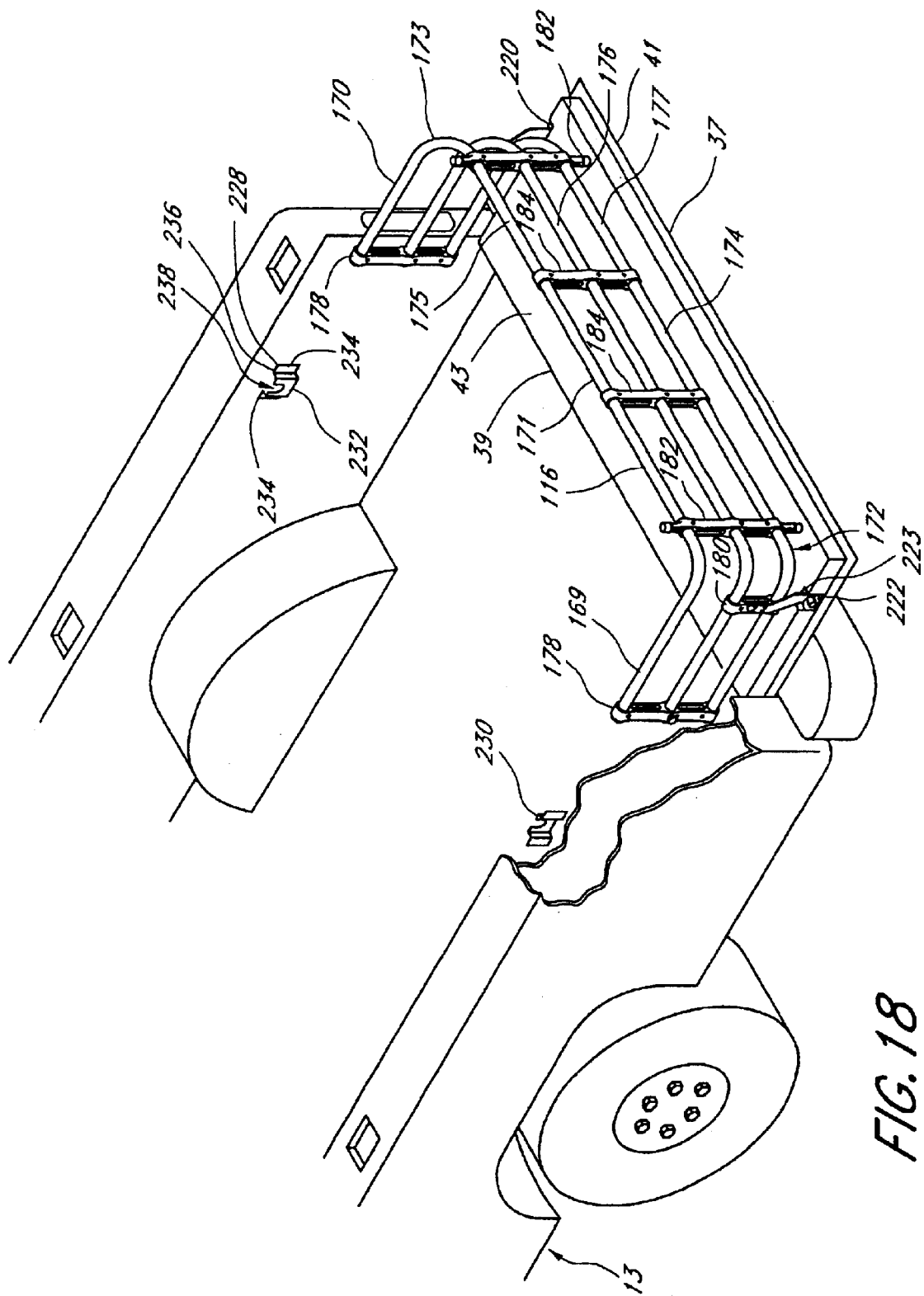
FIG. 18 is a enlarged partial perspective view of a vehicle and alternative bed extender.
Figure 19:
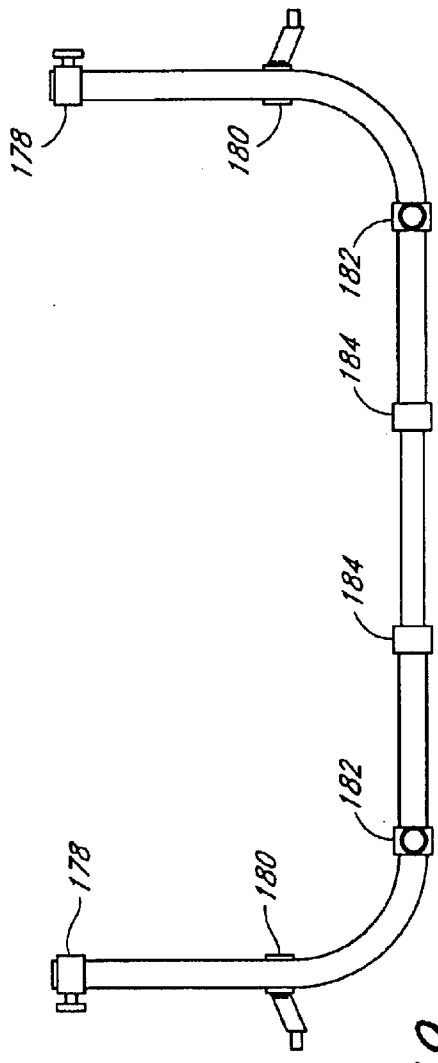
FIG. 19 is a top plan view of the bed extender of FIG. 18.

Referring to FIG. 18, an alternative vehicle bed extender 11b is shown mounted to a truck 13 having a tailgate 37 including a hinge end 39 and a distal end 41 and defining an inner surface 43. The bed extender includes a first side wall 169, a second side wall 170, and a connecting wall 171. As with the extender 11 discussed above, the walls are formed by a first L-shaped section 172 and a second L-shaped section 173 connected by a plurality of straight connecting sections 174. As in the extender 11 of FIG. 1, the sections are formed from L-shaped and straight pieces of tubing. Specifically, each L-shaped section includes a first cross beam 175, a second cross beam 176 and a third cross beam 177. The cross beams and the straight sections 174 are connected by elongate vertical plastic struts. Significantly, the bed extender 11b is shown with a first and a second locking strut which is a combination mount and strut and 78, as previously described in connection with FIG. 13. The extender 11b also includes a first and second latching strut 180 which is a combination interlock and strut, a first and second bumper strut 182 which is a combination bumper and strut, and a first and second simple strut 184. The struts 178, 180, 182 and 184 each define cylindrical openings for receiving the tubular cross beams. The struts 178, 182 and 184 are clamped tightly around the cross beams by means of first, second, and third fasteners 186, 188, and 190, respectively. The first and second latch struts 180 define only two horizontal bores and are secured to only the lower (when the truck bed extender is mounted over the tailgate) two cross members. Each latch strut 180, or connector, defines an outer side 196 defining a mounting surface to which is secured a interlock 200 defining an arm portion 202 and an interlock portion 204. In the embodiment illustrated in FIGS. 18–25, the interlock portion 204 forms a cylinder. Significantly, the latch struts 180 and, therefore, the interlock portion 204 is movable toward the front and rear of the tailgate to ensure proper positioning with respect to the existing tailgate locking mechanism.

The bumper strut 182 includes a first post 210 extending beyond the upper cross beam 175, which is provided with a first resilient bumper 212 and a second post 214 extending below the lower cross member 177, which is provided with a second bumper 216.

Figure 20:
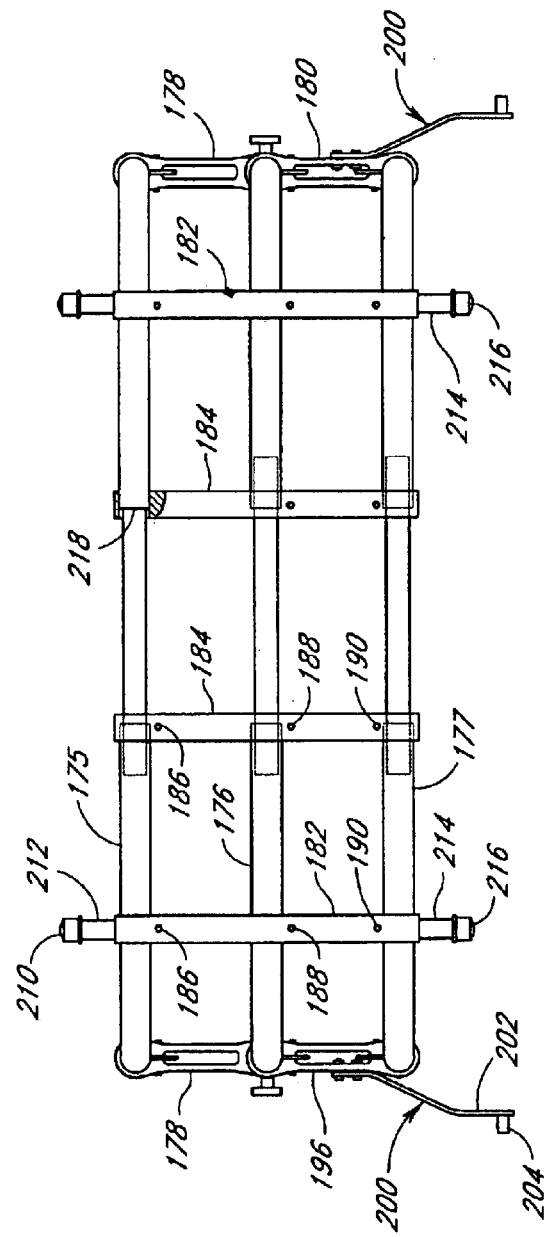
FIG. 20 is a front elevational view of the bed extender of FIG. 18.

Referring to FIG. 20, it will be appreciated that the simple struts 184 are positioned so as to cover the seam 218 between the L-shaped cross beams and the straight connecting sections.

As illustrated in FIGS. 18 and 21–25, the tailgate is provided with a first and second lock mechanism. As both lock mechanisms are mirror images of one another, only the second lock mechanism 222 need be described. The second lock mechanism 222 is positioned within a notch 223 in the tailgate. The lock mechanism 222 includes an interlock portion 224, which is controlled by a release actuator 226. As well known by those of skill in the art, the release actuator 226 typically operates both the first and the second lock mechanisms. Importantly, the locking mechanism described is a standard lock mechanism used on the vehicles to releasably secure the tailgate in an upright position. Thus, no customized lock mechanism is required.

Referring again to FIG. 18, a first holder 228 is mounted to the inner surface of the first upstanding panel 25 and a second holder 230 is mounted to the inner surface of the second upstanding panel 27. As the first holder 228 and second holder 230 are identical, only the first holder 228 will be described. The first holder 228 has a body 232 which is straddled by a pair of L-shaped flanges 234, which are used to space the body 232 from the inner surface of the panel 25 and to provide a surface to mount the holder 228 to the panel 25. The holder defines an upper edge 236, which in turn defines a U-shaped slot 238 having an upper open end and a lower closed end. The purpose of the holders 228 and 230 will be described in detail below. Referring now to FIGS. 21 and 21a, the bed extender 11b is shown disconnected from the truck 13. The bed extender 116 is positioned with the connecting wall 171 being horizontal, the open ends of the extender 116 extending downward and the male members of the locking struts 178 being aligned in a vertical plane with the aperture of the bracket 120. Advantageously, the truck bed extender can be easily aligned in this manner by a single person by grasping the bed extender in two locations spaced on either side of the center of gravity of the bed extender. As shown by the arrows in FIGS. 21 and 22, the bed extender is then simply lowered vertically downward until the axle portion fits between the cusps 129 of the bracket 120. Similarly, the locking portion fits into the wide opening defined by the horizontal upper surfaces 126.

When the truck bed extender reaches the position shown in FIGS. 22 and 22a, the extender 11b can be rotated outward or inward approximately 90E. The curved sides 152 of the axle portions 146 mate with and journal within the curved portion of the bracket 120. When thus rotated, the cusps prevent the axles 146 from lifting out of the brackets 120, as will be understood by one of skill in the art.

FIGS. 23 and 23a show the truck bed extender rotated approximately 60E outward so that the axle portion is secured by the bracket 120.

As will be appreciated by FIGS. 23 and 24, as the bed extender 11b rotates downward, portion 204 of the second interlock 200 is received and retained by the interlock portion 224 of the second lock mechanism 222 of the tailgate. Significantly, the vehicle bed extender is configured such that the only portions of the bed extender 11b in contact with the tailgate 37 are the interlocks 200. That is, as best seen in FIG. 24, when the bed extender is latched to the tailgate with the connecting wall in an upright position, the side walls 169, 170 and the connecting wall 171 are spaced above the tailgate 37. The bumper struts 182 are provided with bumpers only for purposes of cushioning any contact between the connecting wall and the tailgate, in the event the tailgate is jarred such as when the vehicle strikes a speed bump at excessive speed. This positioning of the side walls and connecting walls above the tailgate prevents undesired vibration and rattling.

When it is desired to close the tailgate, it is a simple matter to actuate the release actuator 226, thereby releasing the interlock portions 204 permitting the extender 11b to be rotated upward away from the tailgate about the pivot axis defined by the brackets 120 either to (1) a position where the connecting wall is parallel to the truck bed, so that the truck bed extender can be removed, by lifting it upward in the direction opposite to the arrow shown in FIG. 21, or (2) a position shown in FIGS. 25 and 25a, where the interlock portion 204 of the bed extender is secured within the slot 238 of the holder 230. Again, as the bed extender is secured by the holders 228 and 230 above the vehicle bed, vibration and rattling is minimized. As shown in FIG. 25, in this position, the tailgate can be closed and latched in the usual manner.

Referring now to FIG. 26, an alternative bracket 240 is illustrated. Significantly, the bracket 240 can be mounted on the vehicle solely through the use of an existing fastener 254 used to secure a tailgate safety cable 256 to the side panel 25 of the truck. The first bracket 240 includes a first section 242 extending parallel to the length of the truck, a second section 244 extending perpendicular to the first section and a third section 246 extending parallel to the first section and perpendicular to the second section. The first section 242 defines a connector hole 250 for receiving the fastener 254 used to mount the inner end of the tailgate safety cable 256 to the panel.

Advantageously, due to the configuration of the first bracket 240, no additional fasteners are required to securely mount the bracket 240 to the vehicle. Significantly, the sections cooperate to prevent the rotation of the bracket about the axis of the connector hole 250 when the bracket 240 is mounted on the vehicle.

Figure 27A:
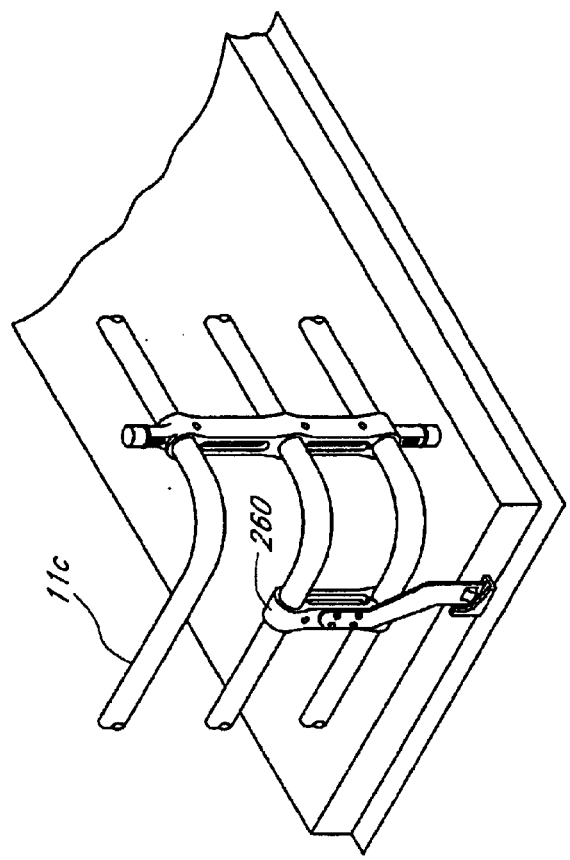
FIGS. 27a—27b illustrate an alternative connector having a buckle configuration.
Figure 27B:
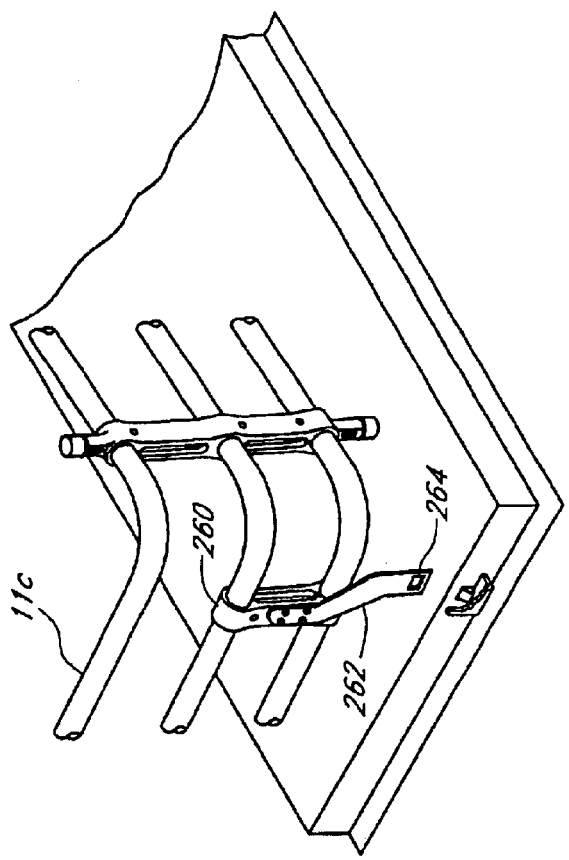
Figure 28:
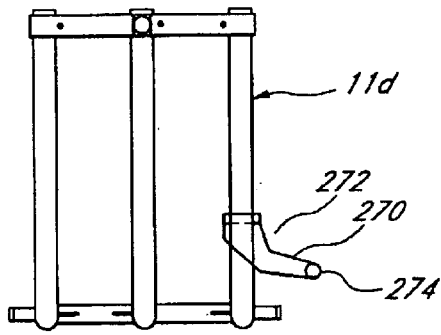
FIGS. 28–33 illustrate an alternative connector.
Figure 32:
Figure 33:
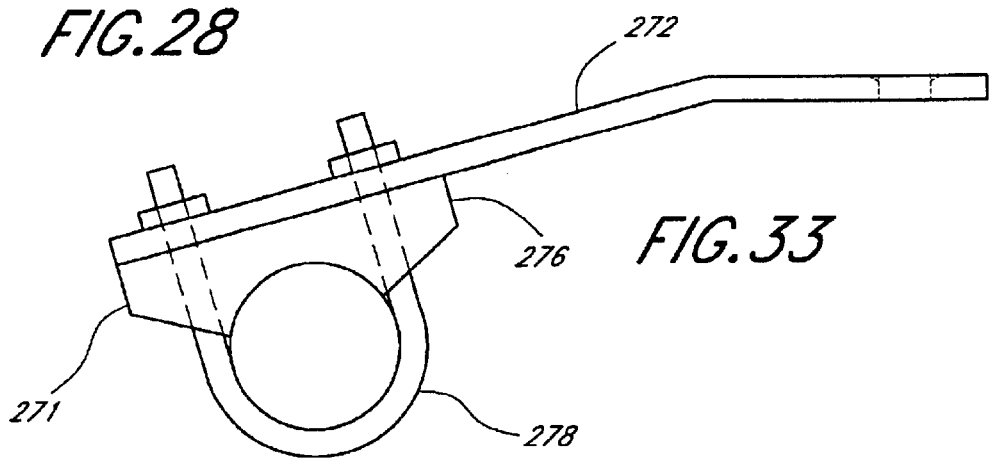
Figure 31:
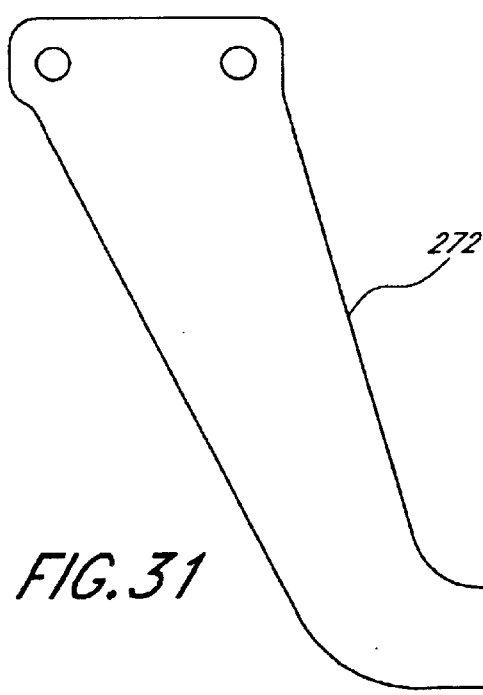
Figure 29:
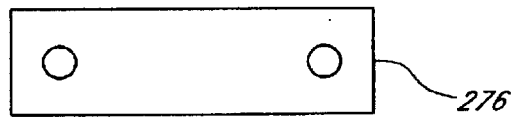
Figure 30:

FIGS. 27a and 27b illustrate an alternative bed extender 11c having a latching strut 260 including an interlock arm 262 having an interlock portion 264 defining a buckle arrangement. This interlock is used in connection with the other major form of standard tailgate locking mechanism, well known to those of skill in the art. Advantageously, the interlock portion 264 provides the only contact between the extender 11c and the tailgate, thereby minimizing vibration and rattling.

FIGS. 28–33 illustrate an alternative connector 270 adapted to be secured to only the lower crossbeam of a bed extender 11d. The connector 270 includes a bracket 271 and an interlock having an arm 272 and an interlock portion 274/ The bracket 271 includes a base 276 and a clamp 278 secured to the base by fasteners. As with the latch struts 180, 260 described above, the connector has the advantage of being movable toward the front and rear of the tailgate to ensure proper positioning with respect to the existing tailgate latch mechanism.

FIGS. 34–37 illustrate holders 280, 282 mountable to the inner surface of the side panels to mate with and retain the interlock portion of a connector, such as the latch strut 180.

FIGS. 38–41 illustrate an alternative bracket 290 and an alternative combination first and second interlock and strut 300 which operates in the same general manner as the bracket and combination interlock and strut illustrated in FIGS. 18–26, with the notable exceptions that the holder is integrally formed with the mount and strut, and the holder is provided with a lock mechanism, as will be described in detail below.

Figures 38, 39:
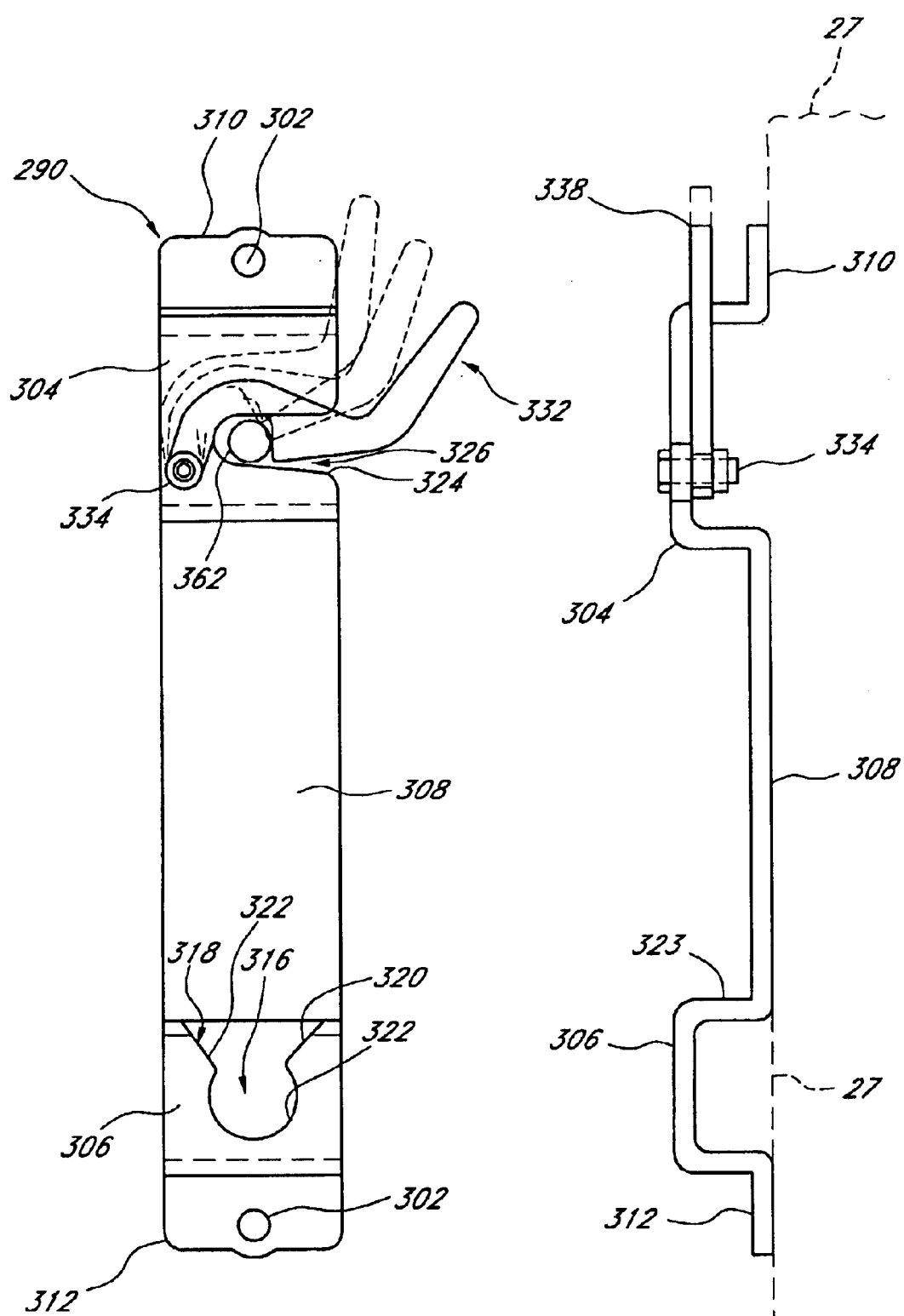
FIGS. 38–41 illustrate an alternative bracket and combination mount, strut and interlock.

Referring now to FIGS. 38 and 39, the elongate bracket 290 is provided with a screwhole 302 at each end. The bracket includes an upper raised holder portion 304 and a lower raised station portion 306. The upper holder portion 304 and lower station portion 306 are separated by spacing flange 308. An upper mounting flange 310 which defines the upper screwhole 302 is provided above the upper holder portion 304. A lower mounting flange 312 defining the lower screwhole 302 is provided below the lower station portion 306.

The lower station portion 306 forms an aperture 316 defined by an upper edge 318. The upper edge 318 includes an arcuate portion 320 which defines a pivot surface and a pair of slanted portions 322 which define a pair of guiding surfaces. As in prior designs, the upper spacing wall 323 of the lower station portion 306 defines an opening for receiving the larger end portion of a male member, as will be described below.

The upper holder portion 304 is similarly spaced outward from the flanges 308, 310 and 312. The upper holder portion 304 includes an edge 324 which defines a U-shaped slot 326 having an open end 328 and a closed end 330. A latch 332 is mounted to the upper holder portion 304 by pivot pin 334.

Figure 40:
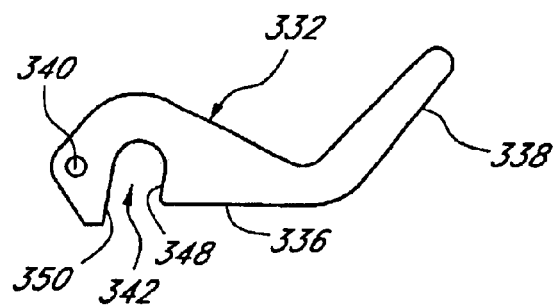

As best seen in FIG. 40, the latch 332 has a generally C-shaped body 336 and a release arm or lever 338. The body 336 further defines a mounting hole 340 opposite the release arm 338. Between the release arm 338 and the mounting hole 340 is a generally U-shaped slot 342 including an open end and a closed end. The slot is formed by an edge which defines a locking surface 348 and an engagement surface 350.

Figure 41:
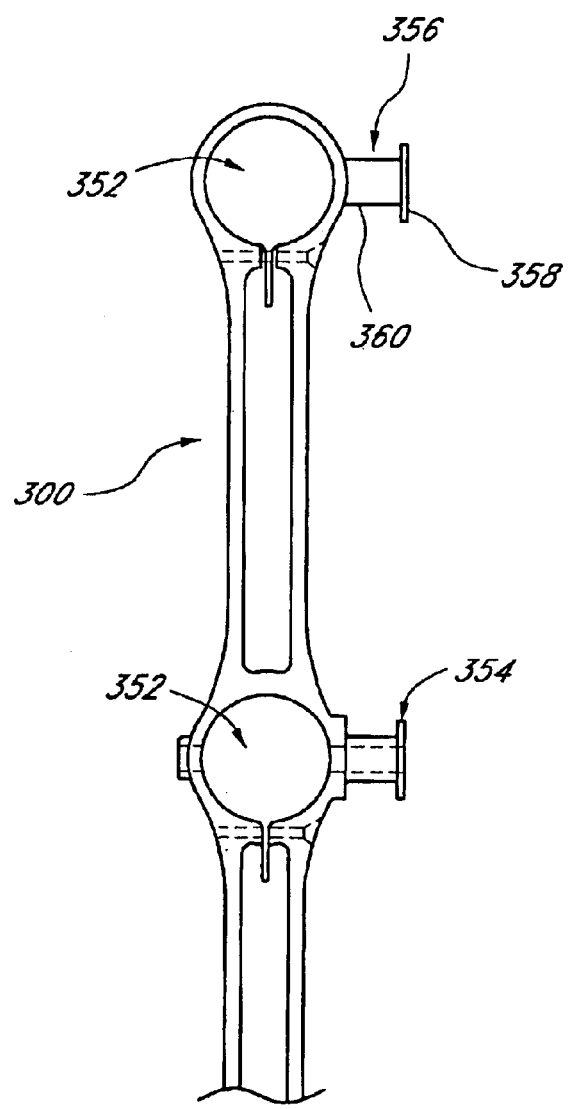
Figure 42:
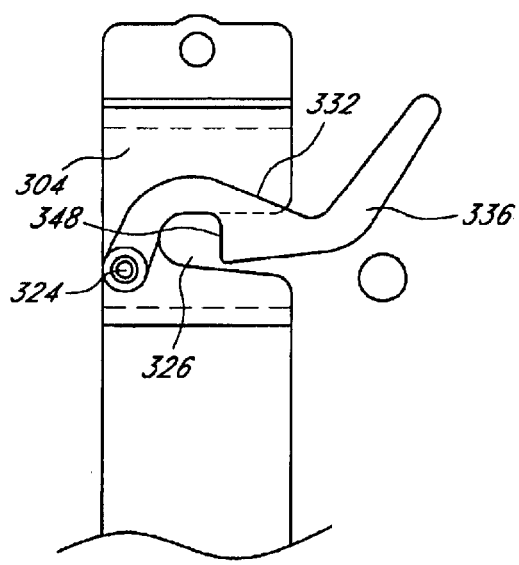
FIGS. 42–45 are corresponding schematic views of the bracket, upper holder, latch and interlock of FIG. 38.

Referring now to FIG. 41, the combination first and second interlock and strut 300 will now be described. The combination first and second interlock and strut 300 has the same general configuration as the combination interlock and strut 140a illustrated in FIG. 13, with certain exceptions. Specifically, the strut 300 includes three openings 352 to receive the cross beams, and includes a first male member 354 similar to the male element 144 previously described in connection with FIG. 12. The combination first and second interlock and strut 300 differs from the combination interlock and strut of FIGS. 13–14 in that it includes a second male member 356 extending from near the upper end of the combination first and second interlock and strut. The second male member 356 includes a larger disc-shaped outer end portion 358 and a smaller cylindrical middle portion 360. The middle portion 360 defines a cylindrical engagement surface 362.

A truck bed extender utilizing the combination first and second interlock and strut 300 and the bracket 290 is operated in a manner very similar to that previously described in connection with the extender, bracket and holder of FIGS. 18–26. As will be appreciated by one of skill in the art, however, the bracket 290 is mounted on the inside vertical surface of one of the upright panels of the vehicle, such as second panel 27, so that the lower station portion is positioned in the same location as the station portion of the bracket 120. Advantageously, because the upper holder portion and lower station portion are formed as a single piece, the holder portion need not be separately positioned and mounted.

Figure 43:
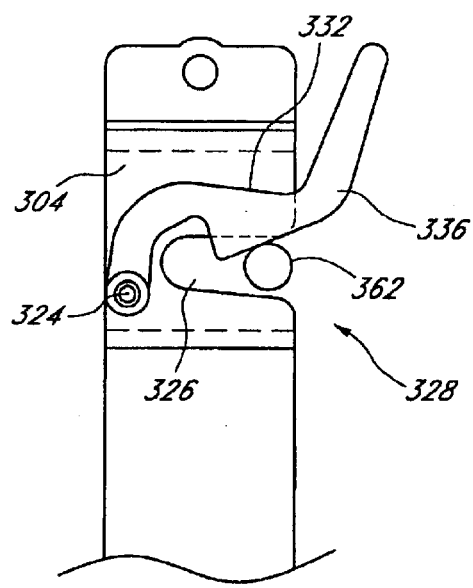
Figure 44:
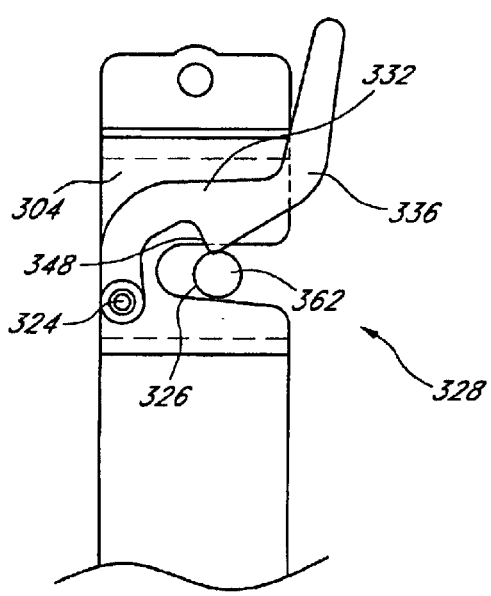
Figure 45:
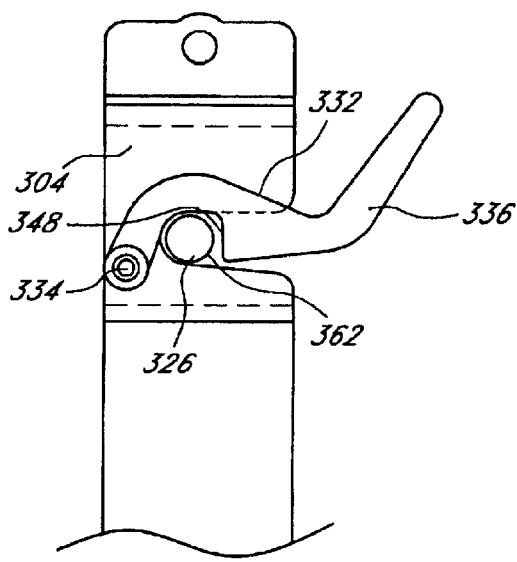

Another advantage of this design is illustrated in FIGS. 42–45, which show an enlarged view of that which has already been described in FIG. 38. When the truck bed extender is rotated to the position shown in FIG. 24, in addition to being locked against radial movement about the pivot axis by the lower station portion 306 as shown in FIG. 38, the cylindrical engagement surface 362 of the smaller middle portion 360 of the second male member 356, seen in FIG. 38, enters into the open end 328 of the U-shaped slot 326 and presses against the body 336 of the latch 332. This causes the latch 332 to rotate about the pivot pin 334 as seen in FIGS. 43 and 44 and in phantom in FIG. 38 until the cylindrical engagement surface is locked in place by the latch 332, as illustrated in FIG. 45. Specifically, the locking surface 348 of the body 336 of the latch 332 prevents the cylindrical engagement surface 362 of the second male member 356, as seen in FIG. 38, from being removed through the open end 328 of the slot 326 of the upper holder portion 304.

When it is desired to release the lock and rotate the truck bed extender so that it is in the position shown in FIG. 25, the release arm 338 of the latch 332 is pushed toward the upper holder portion 304 which, due to its configuration, causes the latch 332 to pivot about the pivot pin 334 as shown in phantom in FIG. 38. Advantageously, the release of this lock member can be achieved through the use of a single finger.

As will be appreciated, this arrangement provides a number of significant advantages. As discussed above, the use of a single piece to define both the holder and station avoid the need for a separate positioning and mounting operation. Further, the use of a separate lock avoids potential wear and tear on the tailgate latch mechanism. Importantly, the automatic nature of the lock ensures that when the truck bed extender is rotated into position over the tailgate, with the connecting wall in a vertical position, the truck bed extender will be locked in place automatically. This essentially eliminates the need for the user to remember to lock the extender into position over the tailgate. Advantageously, the connecting wall of the truck bed extender is locked so as to be spaced above the tailgate avoiding vibration. At the same time, because the extender locks into position, the truck bed extender secures the tailgate against significant upward movement in the event the vehicle rides over a large bump.

Again, the particular arrangement is particularly desirable in that only one combination first and second interlock and strut 300 need be used to lock the bed extender in place. The other side can utilize the standard mounting bracket 120. This is desirable not only from an assembly and cost standpoint, but also facilitates the unlocking of the extender. In this regard, it is further significant that the lock mechanism utilized does not need to be retracted to avoid damage to the side panel of a vehicle during the locking operation.

Figure 46:
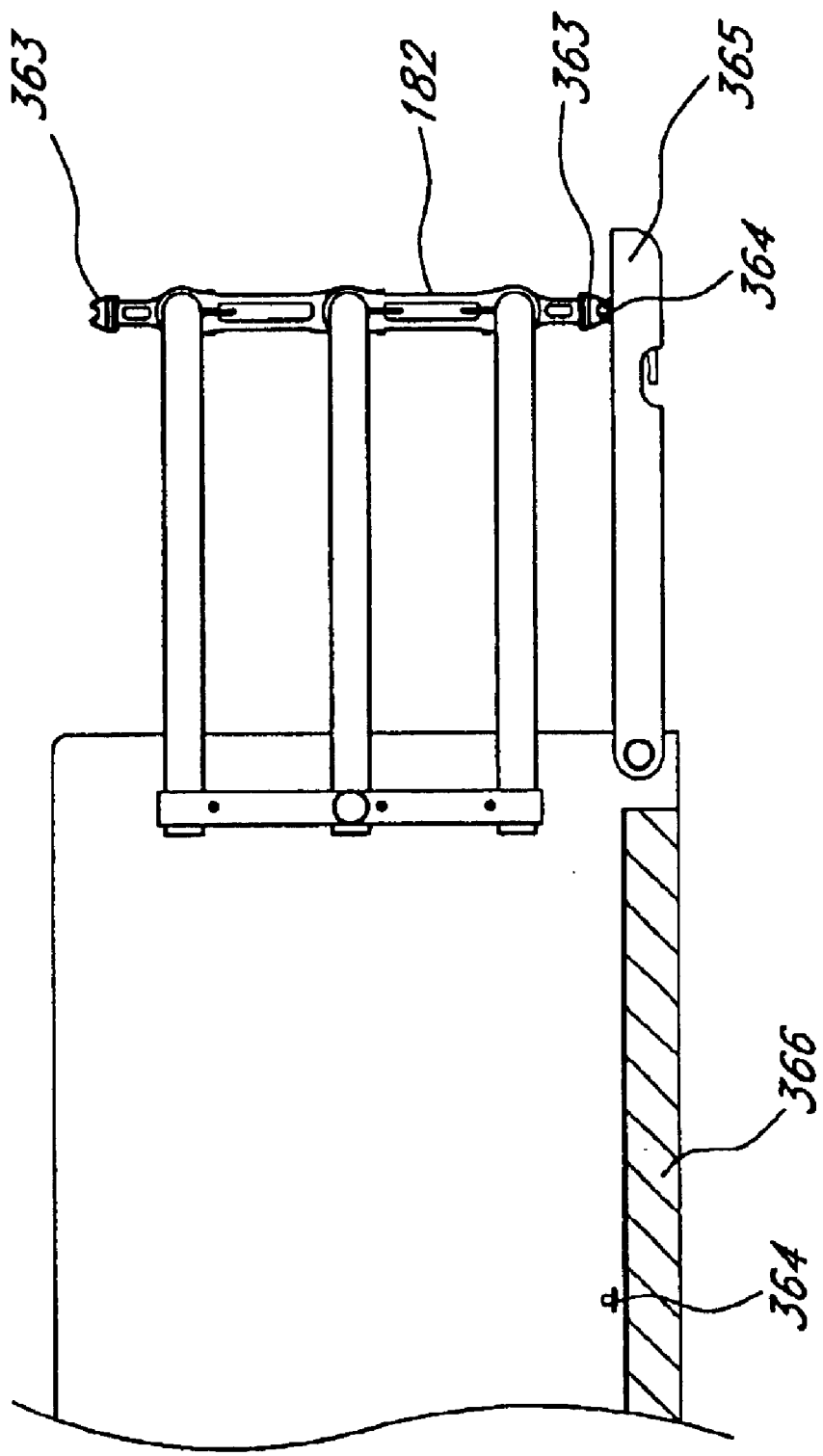
FIGS. 46 and 47 illustrate the mounting of the extender of FIG. 18 using an alternative fastener.
Figure 47:
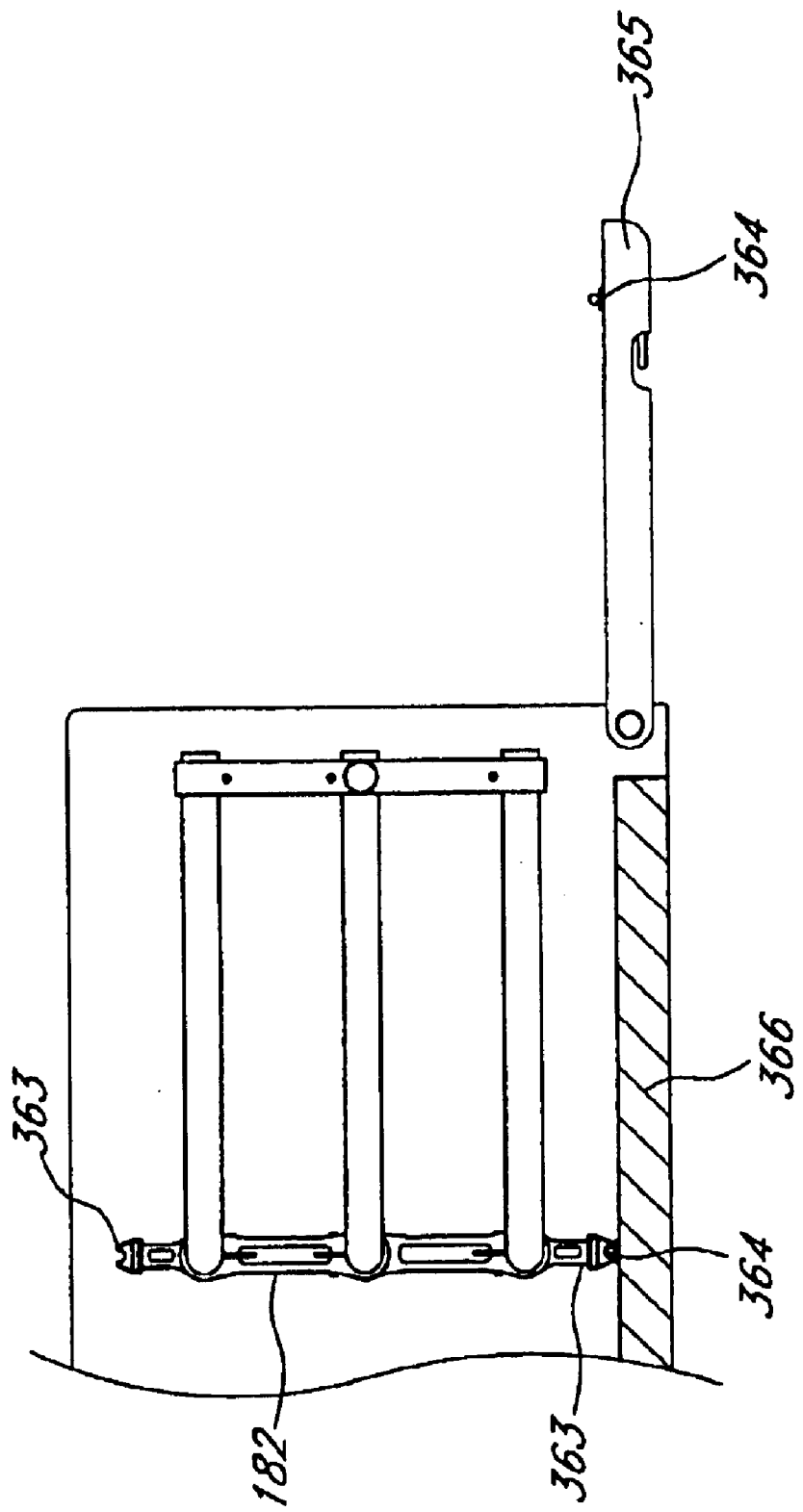

FIGS. 46–51 illustrate an alternative lock consisting of a first and second interlock for securing the extender to the tailgate or bed of the truck. As shown in FIG. 46, the first interlock portion or clamp 363 is affixed to the bumper strut 182. The clamp 363 connects to the second interlock portion or latch or bar 364, which is attached to distal end of the tailgate 365 when the extender is in position over the tailgate, as illustrated in FIG. 46. A third interlock portion 364, identical to the second interlock portion, may also be attached to the bed of the truck 366 when the extender is used to form a rear storage compartment as in FIG. 47.

Figure 48:
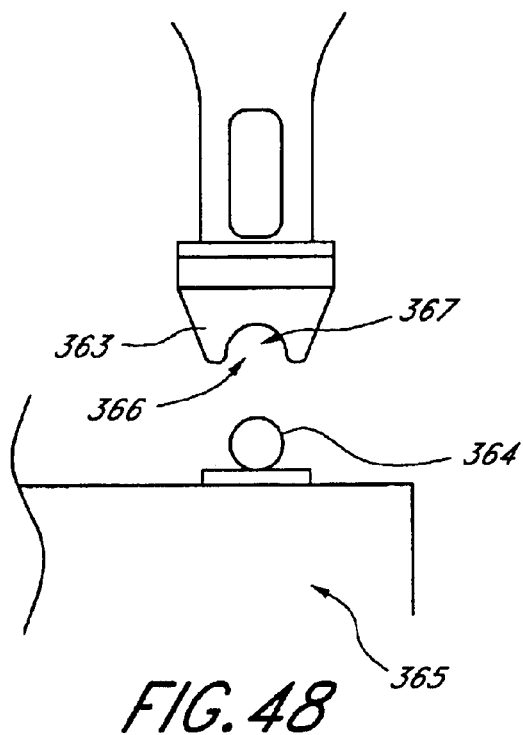
FIGS. 48–50 illustrate the alternative fastener of FIGS. 46 and 47.

FIG. 48 included an enlarged view of the clamp 363. The clamp 363 has an opening 366 to accommodate the bar 364. The opening 366 in the clamp 363 includes a first portion 368 forming a narrow opening and a second portion 367 defining a slot sizable enough to accommodate the bar 364. The clamp 363 is perferably made of a resilient material so that the first portion 368 can expand to allow the bar 364 to enter the receiver slot 367 defined by the second portion. Thus some force must be applied to connect the clamp 363 to the bar 364.

Figure 49:
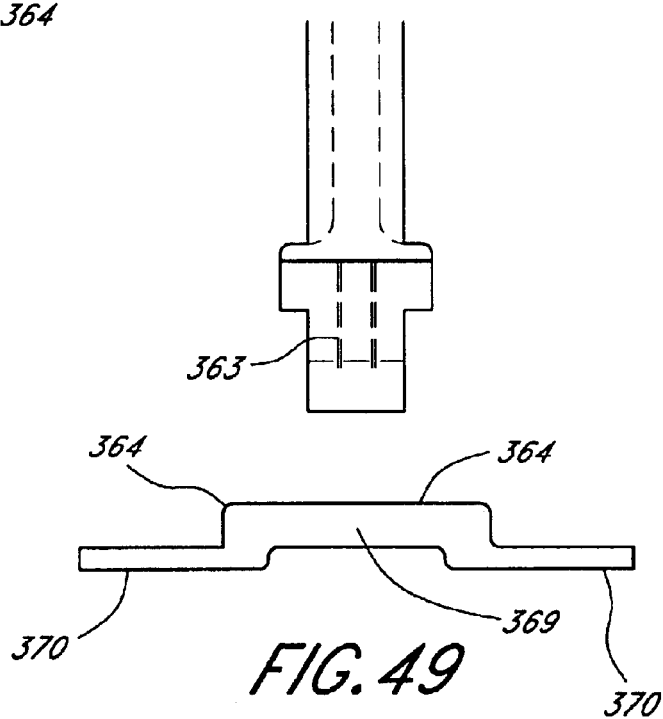
Figure 50:
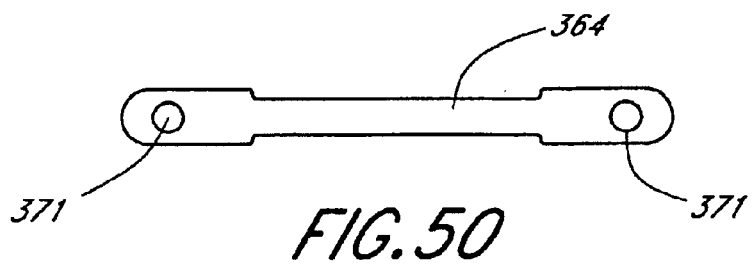

FIG. 49 is a perspective view of the clamp 363 and the bar 364. As can be seen, the bar consists of two flat mounting portions 370 that will serve as the attachment points to the tailgate or bed of the truck and a raised portion 369 to which the clamp 363 attaches. FIG. 50 shows that the bar 364 has two holes 371 which allow the bar 364 to be screwed or bolted to a surface.

Advantageously, the alternative first 363 and second 364 interlock allow the extender to be secured while in use. This reduces unwanted vibration or noise and should prevent unwanted movement of the extender. Importantly, the extender can be simply secured using this lock by simply pressing down on the extender when it is in position. Similarly, pushing up on the extender will release the fastener.

While the invention has been described with reference to certain preferred embodiments, many variations are possible and those of skill in the art will appreciate various modifications within the scope and spirit of the invention.

What is claimed is:

1. A method for an individual to mount a vehicle bed extender on a vehicle having an open storage bed having a rear end, a first upstanding side panel to one side of said bed, a second upstanding side panel to an opposite side of said bed and a tailgate, a first mounting station fixed with respect to said first upstanding panel, a second mounting station fixed with respect to said second upstanding panel, the method comprising:

providing a generally U-shaped vehicle bed extender, said vehicle bed extender having a first side wall, a second side wall, a connecting wall extending between said first side wall and said second side wall, a first mount secured to said first side defining a first mount surface, and a second mount secured to said second side wall defining a second mount surface, wherein said vehicle bed extender is configured to be mounted in a first position in which said connecting wall is in a substantially vertical position over said tailgate rearward of said rear end of said bed and said extender provides access from above to a space between said first side wall and said second side wall and configured to be mounted in a second position in which said connecting wall is in a substantially vertical position over said bed forward of said rear end with said first side wall and said second side wall extending forward toward the connecting wall and said extender provides access from above to said space between said first side wall and said second side wall;

selecting a selected mount position in which to mount said vehicle bed extender, wherein said selected mount position is one of said first position said second position;

aligning said first mount surface with a first station surface define by said first mounting station and aligning said second mount surface with a second station surface defined by said second mounting station;

securing said first mount surface relative to said first mounting station and securing said second mount surface relative to said second mounting station, such at said vehicle bed extender is secured against release.

2. A vehicle bed extender for use on a vehicle having an open storage bed having a rear end, a first upstanding side panel to one side of said bed, a second upstanding side panel to an opposite side of said bed and a tailgate, a first mounting station fixed with respect to said first upstanding panel, a second mounting station fixed with respect to said second upstanding panel, the vehicle bed extender comprising:

a first side wall;

a second side wall;

a connecting wall extending between said first side wall and and second side wall;

a first mount secured to said first side wall;

a second mount secured to said second side wall, wherein said vehicle bed extender is generally U-shaped and is configured to be mounted in a first position in which said connecting wall is in a substantially vertical position over said tailgate of said rear end of said bed and said extender provides access from above to a space between said first side wall and said second side well and configured to be mounted in a second position in which said connecting wall is in a substantially vertical position over said bed forward of said rear end with said first side wall and said second side wall extending forward toward the connecting wall and said extender provides access from above to said space between said first side wall and said second side wall, and wherein said vehicle extender is configured to be mountable by an individual performing the following actions:

selecting a selected mount position in which to mount said vehicle bed extender, wherein said selected mount position is one of said position and said second position;

aligning said first mount with said first mounting station and aligning said second mount with said second mounting station;

inserting one of said first mount and said first station into the other of said first mount and said first station; and inserting one of said second mount and said second station into the other of said second mount and said second station, so that said vehicle bed extender is aligned in said selected mount position.

3. A vehicle bed extender for use on a vehicle having an open storage bed having a rear end, a first upstanding side panel to one side of said bed, a second upstanding side panel to an opposite side of said bed and a tailgate, a first mounting station fixed with respect to said first upstanding panel, a second mounting station fixed with respect to said second upstanding panel, the vehicle bed extender comprising:

a first side wall;

a second side wall;

a connecting wall extending between said first side wall and said second side wall;

a first mount secured to said first side wall defining a first mount surface;

a second mount secured to said second side wall defining a second mount surface, wherein said vehicle bed extender is generally U-shaped and is configured to be mounted in a first position in which said connecting wall is in a substantially vertical position over said tailgate rearward of said rear end of said bed and said extender provides access from above to a space between said first side wall and said second side wall and configured to be mounted in a second position in which said connecting wall is in a substantially vertical position over said bed forward of said rear end with said first aide wall and said second side wall extending forward toward the connecting wall and said extender provides access from above to said space between said first side wall and said second side wall, and wherein said vehicle bed extender is configured to be mountable by an individual performing the following actions:

selecting a selected mount position in which to mount said vehicle bed extender, wherein said selected mount position is one of said first position and said second position;

aligning said first mount surface with a first station surface defined by said first mounting station and aligning said second mount surface with second station surface defined by said second mounting station;

securing said first mount surface relative to said first mounting station and securing said second mount surface relative to said second mounting station, such that said vehicle bed extender is secured against release.

* * * * *

UNITED STATES PATENT AND TRADEMARK OFFICE
CERTIFICATE OF CORRECTION

PATENT NO. : 6,805,392 B2
DATED : October 19, 2004
INVENTOR(S) : Horst Leitner and Jonathan Weisel It is certified that error appears in the above-identified patent and that said Letters Patent is hereby corrected as shown below:

Column 16,
Line 58, after "side" please add -- wall --.

Column 17,
Line 9, after "first position" please add -- and --.
Line 12, please delete "define" and insert therefor -- defined --.
Line 17, please delete "at" and insert therefor -- that --.
Line 30, please delete "and and" and insert therefor -- and --.
Line 38, please delete "well" and insert therefor -- wall --.
Line 46, after "vehicle" please add -- bed --.
Line 50, after "of said" please add -- first --.

Column 18,
Line 34, please delete "aide" and insert therefor -- side --.
Line 46, after "with" please add -- a --.

Signed and Sealed this

Fifth Day of April, 2005

JON W. DUDAS
*Director of the United States Patent and Trademark Office*